United States Patent [19]

Yamakawa et al.

[11] Patent Number: 5,600,747
[45] Date of Patent: Feb. 4, 1997

[54] METHOD OF COLLECTIVELY CONNECTING MULTIPLE OPTICAL CONNECTORS AND ALIGNING AND POSITIONING JIG FOR MULTIPLE OPTICAL CONNECTORS USED IN THE METHOD

[75] Inventors: Jun Yamakawa; Hiroyuki Yanagase; Masato Shiino; Hideki Miyazaki, all of Tokyo; Shinji Nagasawa, Mito, all of Japan

[73] Assignees: The Furukawa Electric Co., Ltd.; Nippon Telegraph and Telephone Corporation, both of Tokyo, Japan

[21] Appl. No.: 511,315

[22] Filed: Aug. 4, 1995

[30] Foreign Application Priority Data

Aug. 12, 1994 [JP] Japan .................................. 6-211812

[51] Int. Cl.⁶ ..................................................... G02B 6/38
[52] U.S. Cl. .................... 385/59; 385/71; 385/89
[58] Field of Search ................. 385/59, 71, 58, 385/60, 70, 72, 78, 89

[56] References Cited

U.S. PATENT DOCUMENTS

| | | | |
|---|---|---|---|
| 5,216,732 | 6/1993 | Knott | 385/59 |
| 5,222,168 | 6/1993 | Saito et al. | 385/59 |
| 5,379,360 | 1/1995 | Ota et al. | 385/59 |
| 5,379,361 | 1/1995 | Maekawa et al. | 385/71 |

*Primary Examiner*—John D. Lee
*Assistant Examiner*—Phan T. H. Palmer
*Attorney, Agent, or Firm*—Frishauf, Holtz, Goodman, Langer & Chick

[57] ABSTRACT

A method of collectively connecting multiple optical connectors each having an altered-shape portion which is at least one of a recessed shape or a projecting shape on an outer surface, and an aligning and positioning jig used in this method. After multiple optical connectors are aligned and positioned by using an aligning and positioning jig for engaging the altered-shape portions of the multiple optical connectors to one another to position the multiple optical connectors, multiple optical connectors aligned and positioned on one side are collectively connected to multiple optical connectors aligned and positioned on the other side. Then the aligning and positioning jig is removed from multiple pairs of connected optical connectors.

10 Claims, 18 Drawing Sheets

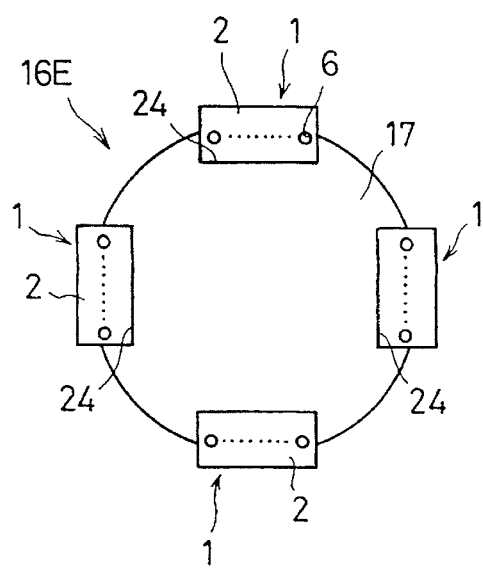
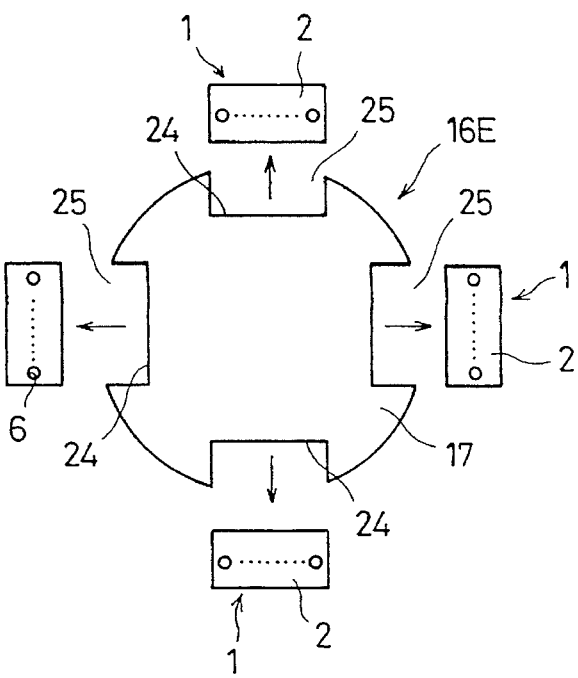
FIG.9A
FIG.9B
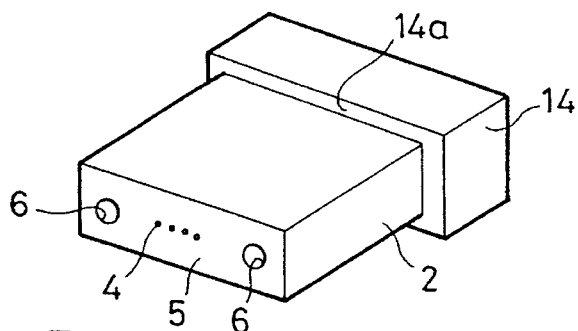
FIG.14A
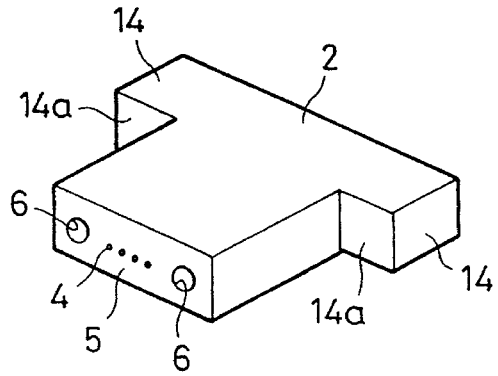
FIG.14B
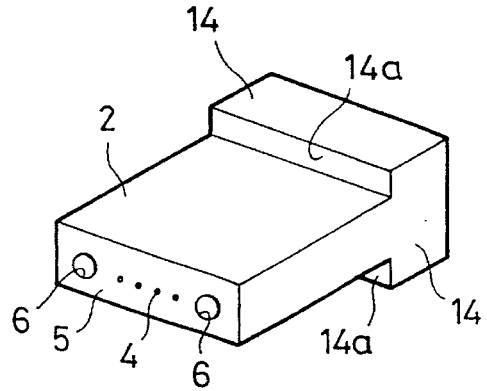
FIG.14C

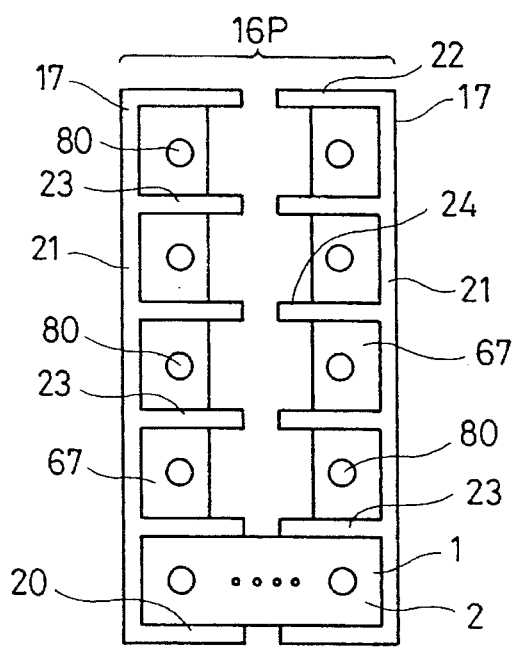
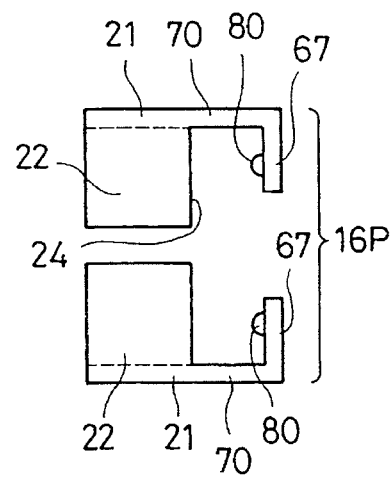
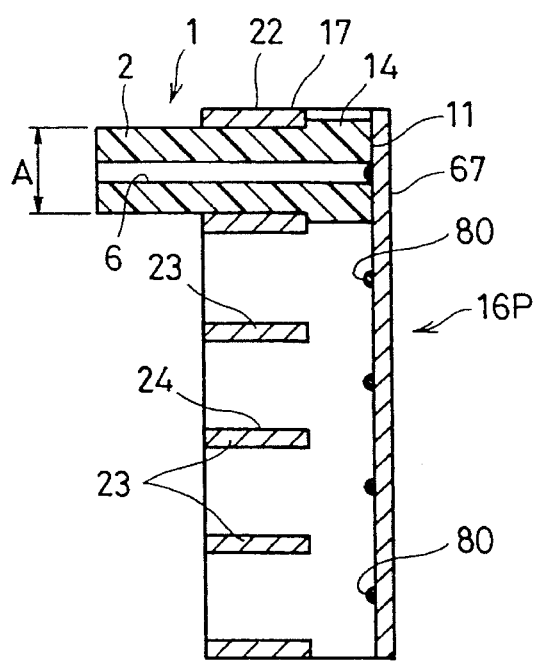
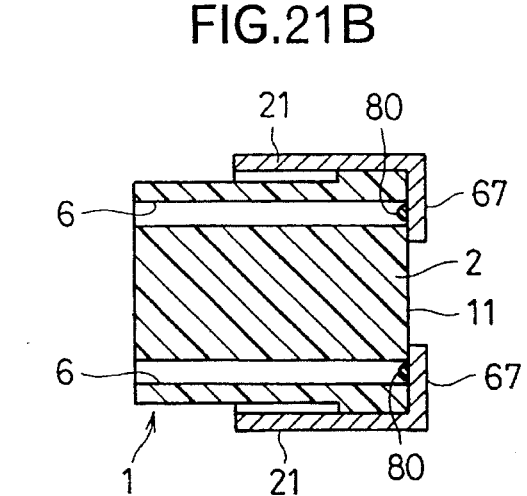
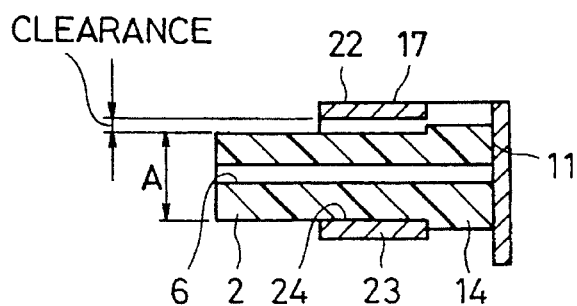

METHOD OF COLLECTIVELY CONNECTING MULTIPLE OPTICAL CONNECTORS AND ALIGNING AND POSITIONING JIG FOR MULTIPLE OPTICAL CONNECTORS USED IN THE METHOD

BACKGROUND OF THE INVENTION

1. Field of the Invention

The present invention relates to a method of collectively connecting multiple optical connectors and an aligning and positioning jig for multiple optical connectors which is used in this method.

2. Description of the Related Art

FIG. 28 shows an example of the connection of optical fiber cables of an optical communications network using optical connectors. In FIG. 28, each optical connector 1 comprises a multifiber ferrule 2 attached with a multi-optical fiber ribbon 3. The multifiber ferrule 2 has a plurality of through holes 4 for the insertion of optical fibers, arranged at equal pitches in the horizontal direction (in the widthwise direction of the ferrule). The through holes 4 penetrate to a connection end face 5 on the distal end side from the proximal end side. The individual optical fibers of the multi-optical fiber ribbon 3 are securely fitted in the respective through holes 4 and their free ends are polished together with the connection end face 5.

A pair of pin holes 6 which are open to the connection end face 5 are formed in the multifiber ferrule 2 on both sides sandwiching the through holes 4. Fitting pins (guide pins) 7 are fitted in the respective pin holes 6, and the free ends of the fitting pins 7 are then fitted in the respective pin holes 6 of the mating optical connector 1. Accordingly, the connection end faces 5 of the two optical connectors 1 abut on each other, and the individual optical fibers of the multi-optical fiber ribbon 3 of one optical connector 1 are coaxially connected to the individual optical fibers of the multi-optical fiber ribbon 3 of the other optical connector 1.

Under this state, a clamp spring 8 is attached to both the optical connectors 1,1 so that spring-force applying portions 10 of the clamp spring 8, which applies the elastic restoring force, is press-fitted on rear end faces 11 of the multifiber ferrules 2. Then, this spring force presses the multifiber ferrules 2 in such directions as to press-fit the connection end faces 5 against each other, thereby stably keeping the connection of the optical connectors 1,1.

Recently, there is an increasing demand for optical fiber cables as the multifunction capability of optical communications networks is improved. As the demand for optical fiber cables increases, an attempt is made to increase the number of optical fibers of each optical fiber cable. Under this situation, the system of connecting multiple optical fibers in optical fiber cables by fitting two optical connectors 1 to each other has a poor working efficiency. In connecting 1000 optical fibers comprising 250 4-optical fiber ribbons, for example, the connection of optical connectors 1 pair by pair requires 250 pairs of optical connectors and repeating the task of connecting the optical connector pair 250 times. This increases the ratio of the fitting of the optical connector pair in the entire connecting work, resulting in a poor working efficiency. With this system, therefore, it is difficult to cope with the recent trend of increasing the number of fibers of each optical fiber cable.

In view of the above, there are made studies on high fiber density with an increased number of optical fibers to be attached to the optical connector 1 and on the collective connection of multiple optical connectors 1 at a time. FIG. 27 shows one example of multi-layered connector which can ensure such collective connection.

The multi-layered connector shown in FIG. 27 has a box-like housing 13 having an opening 12 formed in the front end face, multiple optical connectors 1 retained in lamination in the housing 13 through the opening on the rear end side, and pin holes 9 formed in the four corners of the front end face of the housing 13.

The collective connection of a plurality of optical connectors is accomplished by connecting one group of optical connectors laminated in one housing 13 with fitting pins inserted in the pin holes 9, to another group of optical connectors laminated in another housing 13 in such a manner that the connection end faces 5 of the optical connectors in one housing 13 are positioned to abut on the associated connection end faces 5 of the optical connectors in the other housing 13, by fitting the fitting pins protruding from one housing 13 into the pin holes 9 in the other housing 13 and fitting the fitting pins 7 on the optical connectors in one housing 13 into the pin holes 6 (see FIG. 28) of the optical connectors in the other housing 13.

The multi-layered connector shown in FIG. 27 allows for the collective connection of multiple optical connectors 1, thereby significantly improving the working efficiency for connecting multiple optical fibers of an optical fiber cable.

Because the multi-layered connector shown in FIG. 27 is designed to collectively connect one group of optical connectors placed in lamination in one box-like housing 13 to another group of optical connectors placed in lamination in another box-like housing 13, the housings 13 cannot be removed after the optical connectors are collectively connected to the mating optical connectors. The optical-connector jointing portion of the multi-layered connector shown in FIG. 27 bulges, so that the bulging optical-connector jointing portion occupies extra space particularly when the multi-layered connector is accommodated in a closure.

SUMMARY OF THE INVENTION

It is a primary objective of the present invention to provide a method for collectively connecting multiple optical connectors, thus improving the efficiency of connecting the multiple connectors of an optical fiber cable, and an aligning and positioning jig for multiple optical connectors which is used in this method.

It is another objective of this invention to provide a collective connection method of multiple optical connectors, which can suppress the bulging of the optical-connector joining portion to contribute to reducing the required installing space, and an aligning and positioning jig for multiple optical connectors which is used in this method.

To achieve the above objects, according to one aspect of this invention, there is a method of collectively connecting multiple optical connectors each having an altered-shaped portion which is at least one of a recessed shape or a projecting shape on an outer surface, which method comprises the steps of preparing an aligning and positioning jig for engaging the altered-shape portions of the multiple optical connectors to one another to position the multiple optical connectors; aligning and positioning multiple optical connectors using the aligning and positioning jig and then collectively connecting multiple optical connectors aligned and positioned on one side to multiple optical connectors aligned and positioned on the other side; and then removing the aligning and positioning jig from multiple pairs of connected optical connectors.

It is preferable that a connection holding member for individually or collectively keeping connecting states of the pairs of connected optical connectors should be detachably attached to the pairs of connected optical connectors, after removing the aligning and positioning jig.

It is also preferable that after collectively connecting the multiple optical connectors aligned and positioned on one side to the multiple optical connectors aligned and positioned on the other side, a connection holding member for individually or collectively keeping connecting states of the pairs of connected optical connectors should detachably be attached to the pairs of connected optical connectors before completely removing the aligning and positioning jig, and the aligning and positioning jig should completely be removed after attachment of the connection holding member.

It is further preferable that the connection holding member should be provided for each pair of optical connectors and the connection holding members should be coupled by a link member, thereby keeping aligned connection states of individual pairs of optical connectors.

It is preferable that the link member should be detachable so as to permit each pair of optical connectors to be detached from another pair of optical connectors while keeping each pair of optical connectors connected to each other, when the link member is detached.

According to another aspect of this invention, there is provided an aligning and positioning jig for use in collective connection of multiple optical connectors each having an altered-shape portion which is at least one of a recessed shape or a projecting shape on an outer surface, which jig comprises a jig body; retainers formed in the jig body for retaining multiple optical connectors at predetermined aligned positions; engage portions provided at the retainers for engagement with altered-shape portions of the retained optical connectors to thereby position the optical connectors; and a detaching opening formed in the jig body for allowing the jig body to be detached from the optical connectors while keeping the optical connector in each retainer connected to a mating optical connector.

It is preferable that each of optical connectors to be collectively connected should have at least a pair of fitting holes formed in a rear end side, each of the retainers formed in the jig body should have projections formed at positions corresponding to the fitting holes in such a way as to position each optical connector in the associated retainer when at least distal ends of the projections are inserted into the fitting holes.

A further feature of the aligning and positioning jig of this invention lies in that each of the engage portions formed in the retainers of the jig body is made of an elastic material, and each of the engage portions has a retaining opening so as to be able to hold the altered-shape portion formed in a rear portion of each optical connector, an opening width of the retaining opening is set equal to or less than a width of the altered-shape portion.

According to this invention with the above-described structure, the individual optical connectors of one optical connector group positioned by the aligning and positioning jig are collectively connected to the respective optical connectors of another optical connector group also positioned by the aligning and positioning jig. After or before the removal of the aligning and positioning jig in this collectively-connected state, the connection holding members are attached to the respective pairs of connected optical connectors to stably maintain the connection state of each pair of optical connectors. After a plurality of optical connectors are collectively connected, the aligning and positioning jig is removed to eliminate the bulging portion of the aligning and positioning jig, thus reducing the required installation space.

According to this invention, multiple optical connectors are aligned and positioned and one group of optical connectors are then collectively connected to the other group of optical connectors. Even when the number of the optical connectors of an optical cable is increased with an expansion of optical communications networks, therefore, the collective connection of multiple optical connectors can easily be accomplished. This can significantly improve the working efficiency in connecting the optical connectors and can shorten the time for the connection.

Particularly, if the aligning and positioning jig for optical connectors is provided with projections formed in the optical-connector retaining regions at the positions corresponding to the fitting holes, formed in the rear ends of the optical connectors to be retained, in such a way as to position each optical connector in the associated retainer when at least distal ends of the projections are inserted into the fitting holes, it is possible to suppress the removal of the jig body before connecting multiple optical connectors. Even when the sizes of the optical connectors differ from one another, therefore, it is possible to stably connect the multiple optical connectors using this aligning and positioning jig. When the fitting holes are formed as guide-pin holes, the projections can prevent the guide pins from protruding from the rear ends of the optical connectors.

Further, each of the engage portions formed in the retainers of the jig body is made of an elastic material, and each of the engage portions has a retaining opening so as to be able to hold the altered-shape portion formed in the rear portion of each optical connector, an opening width of the retaining opening is set equal to or less than the width of the altered-shape portion. Even if the sizes of the optical connectors to be accommodated in the retainers differ from one another, the optical connectors can surely be stopped by the engage portions, thus ensuring stable connection of multiple optical connectors using this aligning and positioning jig.

According to this invention, after multiple optical connectors are connected, the aligning and positioning jig can be removed from the connected optical connectors while maintaining the connection. The removal of the aligning and positioning jig can reduce the occupying space of the optical-connector jointing portions and eliminate extra space at the time placing the jointing portions in the closures or the like, thus ensuring high-density accommodation of the connected optical connectors.

Further, this invention can accomplish easy aligning and positioning of optical connectors and easy collective connection thereof not only at the time of factory shipment after the connection of the optical connectors but also on the spot of connecting the optical connectors, thus considerably improving the working efficiency in connecting multiple optical connectors on the spot.

Furthermore, this invention has a significant use value in that it can allow conventional optical connectors to be used to collectively connect existing optical connectors to one another or to collectively connect existing optical connectors to optical connectors for a new optical communications network.

The aforementioned objects and other objects, features and advantages of the present invention may be readily apparent by reference to the following description of the presently preferred embodiments together with the accompanying drawings.

BRIEF DESCRIPTION OF THE DRAWINGS

FIG. 9A is a front view of an aligning and positioning jig according to a fifth embodiment of this invention;

FIG. 9B is a front view illustrating a pair of connected optical connectors being removed from the jig in FIG. 9A;

FIG. 14A is a perspective view of a multifiber ferrule which is one component of an optical connector;

FIG. 14B is a perspective view of a multifiber ferrule having another shape;

FIG. 14C is a perspective view of a multifiber ferrule having a different shape;

FIG. 20A is a front view of an aligning and positioning jig according to a fifteenth embodiment of this invention;

FIG. 20B is a plan view of the jig in FIG. 20A;

FIG. 21A is a side view showing the cross section of an aligning and positioning jig according to the fifteenth embodiment of this invention;

FIG. 21B is a plan view showing the cross section of the jig in FIG. 21A;

FIG. 21C is a side view showing in cross section a part of the jig without projections in which optical connectors are retained;

DETAILED DESCRIPTION OF THE PREFERRED EMBODIMENTS

Preferred embodiments of the present invention will now be described with reference to the accompanying drawings.

First Embodiment

Figure 1:
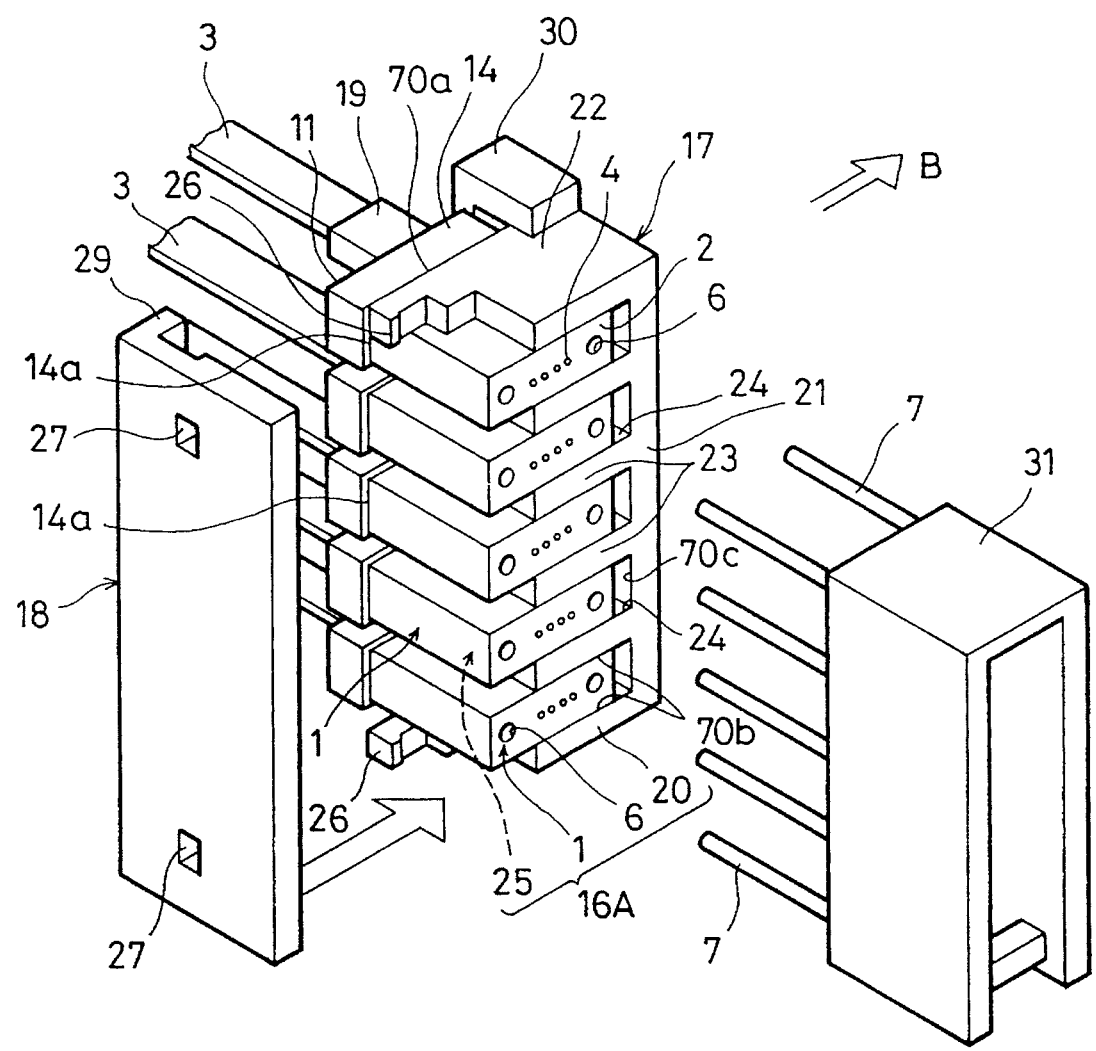
FIG. 1 is a perspective view of an aligning and positioning jig according to a first embodiment of this invention.

FIG. 1 shows the first embodiment of this invention. As optical connectors to be collectively connected are designed like the optical connector 1 shown in FIG. 28, same reference numerals as used in FIG. 28 will also be used for the corresponding or identical components to avoid repeating their descriptions. In FIG. 1, reference numeral "19") denotes a protection boot for the ferrule connecting portion of the multi-optical fiber ribbon 3.

Figures 2A, 2B:
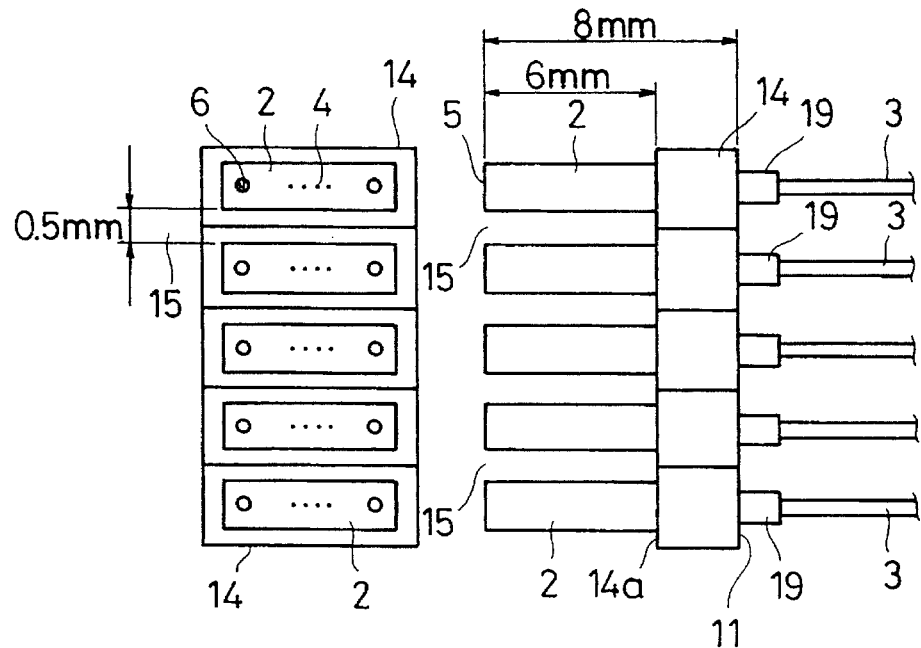
FIG. 2A is a front view showing the lamination state of optical connectors to be connected.
FIG. 2B is a side view of FIG. 2A.

As shown in FIG. 2B, the length of the optical connector 1 from the rear end face 11 of a multifiber ferrule 2 to a connection end face 5 of the distal end of the ferrule 2, is set to 8 mm, and the length of the ferrule body excluding a flange 14 is set to 6 mm in this embodiment. The width of the circumferential extending portion of the flange 14 of the optical connector 1 is set to 0.25 mm, and a clearance 15 of 0.5 mm is formed between the ferrule bodies when multiple optical connectors 1 are placed one on another by stacking the flanges 14 as shown in FIGS. 2A and 2B. In this embodiment, an aligning and positioning jig for aligning and positioning the multiple optical connectors 1 one on another is prepared by using the flanges 14 and the clearances 15, and the multiple optical connectors 1 are collectively connected using this jig.

FIG. 1 shows the multiple optical connectors 1 being positioned and aligned one on another using an aligning and positioning jig (hereinafter simply called "jig") 16A. The jig 16A has a body 17 and a side cover 18, which are made of metal or synthetic resin.

Figure 3A:
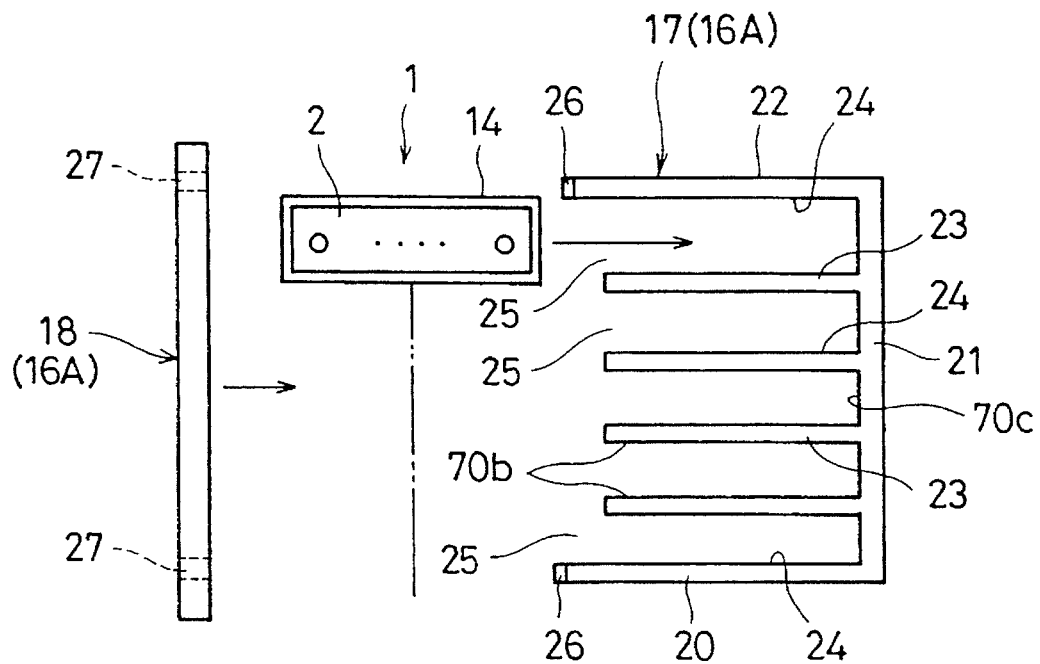
FIG. 3A is a front view for explaining the alignment and positioning of multiple optical connectors.

The body 17 has a U-shaped frame comprising a bottom plate 20, a side plate 21 and a top plate 22, as shown in FIG. 3A. A plurality of platforms 23 on which multifiber ferrules 2 are to be placed protrude from the inner wall of the side plate 21 in parallel to the bottom plate 20 and the top plate 22 at equal intervals in the up and down direction. Those platforms 23 form retainers 24 for the optical connectors 1. The side of the retainer 24 which faces the side plate 21 is open, forming a window 25. Each window 25 is used when the body 17 is removed from the multiple optical connectors 1 after the plurality of optical connectors 1 retained in the retainers 24 are connected to the mating optical connectors.

The vertical intervals between the retainers 24 was set equal to the thickness of the ferrule body (=2.5 mm), and the thickness of each platform 23 was set to 1.3 mm because the clearances between the stacked ferrule bodies shown in FIGS. 2A and 2B was set to 0.5 mm or greater. When the optical connectors 1 are inserted in the respective retainers 24 of the jig 16A, the front end faces 14a of the flanges 14 of the multifiber ferrules 2 abut on the facing end faces of the bottom plate 20, the side plate 21, the top plate 22 and the platforms 23.

The facing end faces serve as engage portions 70a for the forward and backward positioning of the optical connectors 1. The surfaces of the bottom plate 20, the top plate 22 and the platforms 23 which face the top and bottom surfaces of the ferrule bodies serve as engage surfaces (engage portions) 70b which restrict the positions of the optical connectors 1 in the up and down directions. The internal surface of the side plate 21, which faces the sides of the multifiber ferrules 2, serves as an engage surface (engage portion) 70c which restricts the positions of the optical connectors 1 in the lateral directions. The body 17 further has pawls 26 formed at the end portions of the bottom plate 20 and top plate 22.

The side cover 18 has pawl holes 27 formed at positions corresponding to the upper and lower pawls 26 of the body 17. The side cover 18 further has a pressing plate 29 (See FIG. 1) which protrudes inward from the rear side of the cover 18 substantially at the right angles. The side cover 18 is put on the body 17 from the window (25) side and is attached to the body 17 by the engagement of the pawls 26 with the respective pawl holes 27. Accordingly, the pressing plate 29 engages with the rear end faces of the optical connectors 1 retained in the individual retainers 24 of the body 17, and the flanges 14 of the multifiber ferrules 2 are pressed against the engage portions 70a of the body 17. The multiple optical connectors 1 are positioned and aligned as the sides of the individual multifiber ferrules 2 are pressed against the side plate 21 of the body 17.

A U-shaped member 30 in FIG. 1 which is at the rear end side of the body 17 is provided integrally with the body 17 or is detachably attached to the body 17. The member 30 can serve to restrict the lateral positioning of the optical connectors 1 as needed. The member 30, when designed to be fitted on the body 17, is to be fitted on the body 17 as if to clamp the optical connectors 1 from the rear sides after the optical connectors 1 are placed in the retainers 24. Accordingly, the member 30 can serve in the same manner as the pressing plate 29 of the side cover 18 which presses the flanges of the optical connectors 1 against the end face of the frame of the body 17.

Fitting pins 7 are inserted in the individual optical connectors 1, placed one on another using the jig 16A, by a pin inserting tool 31 shown in FIG. 1. The pin inserting tool 31 has a plurality of pin holes formed at the positions corresponding to pin holes 6 of the individual optical connectors 1 stacked and aligned in the body 17. As the fitting pins 7, which have previously been inserted in the pin holes of the pin inserting tool 31, are pushed into the associated pin holes 6 of the individual aligned optical connectors 1 using the pin inserting tool 31, all the fitting pins 7 are inserted into the associated pin holes 6 of the optical connectors 1.

In this case, the fitting pins 7 may be inserted into the pin holes 6 of the aligned optical connectors 1 one by one, without using the pin inserting tool 31.

The jig 16A according to the first embodiment, which has the above-described structure, collectively connects multiple optical connectors 1 in the following manner.

First, multiple optical connectors (five optical connectors in FIG. 3A) are inserted into the retainers 24 of the body 17 from the window (25) side, as shown in FIG. 3A.

Next, the side cover 18 is put on the window (25) side as indicated by the arrow and is attached to the body 17 by engaging the pawls 26 with the pawl holes 27. Consequently, the individual optical connectors 1 receive the lateral pressing force of the side cover 18 and the forward pressing force of the pressing plate 29, and the flanges 14 engage with the engage portions 70a, 70b and 70c of the body 17, so that the optical connectors 1 are properly positioned and aligned.

Then, the connection end faces 5 of the individual optical connectors 1 are cleaned with cloth or the like impregnated with, for example, alcohol, and the fitting pins 7 are inserted into the associated pin holes 6.

After a refractive index matching agent (matching oil or matching grease) is coated on the connection end faces 5, the fitting pins 7 are inserted into the associated pin holes 6 of another group of optical connectors 1 which are likewise aligned using another jig 16A.

Consequently, the connection end faces 5 of one group of optical connectors 1 respectively abut on the connection end faces 5 of the other group of optical connectors 1, so that the optical fibers of one group of optical connectors 1 are optically connected to the associated optical fibers of the other group of optical connectors 1. In this manner, one group of optical connectors can be collectively connected to the other group of optical connectors in a very short period of time through a one-action operation of merely fitting the fitting pins 7 into the associated pin holes 6.

Figure 3B:
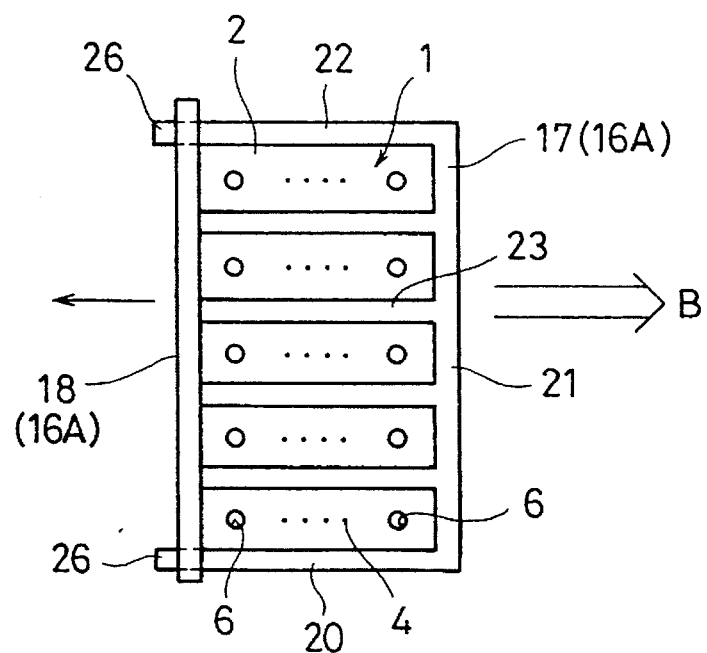
FIG. 3B is a front view for explaining the removal of the aligning and positioning jig from laminated multiple optical connectors.

After this collective connection is made, the pawls 26 are disengaged from the pawl holes 27 to remove the side cover 18. As the body 17 is pulled out in the direction of the arrow B in FIGS. 1 and 3B in this state, pairs of connected optical connectors come out of the window 25 of the body 17 and the jig 16A is removed.

Figure 4A:
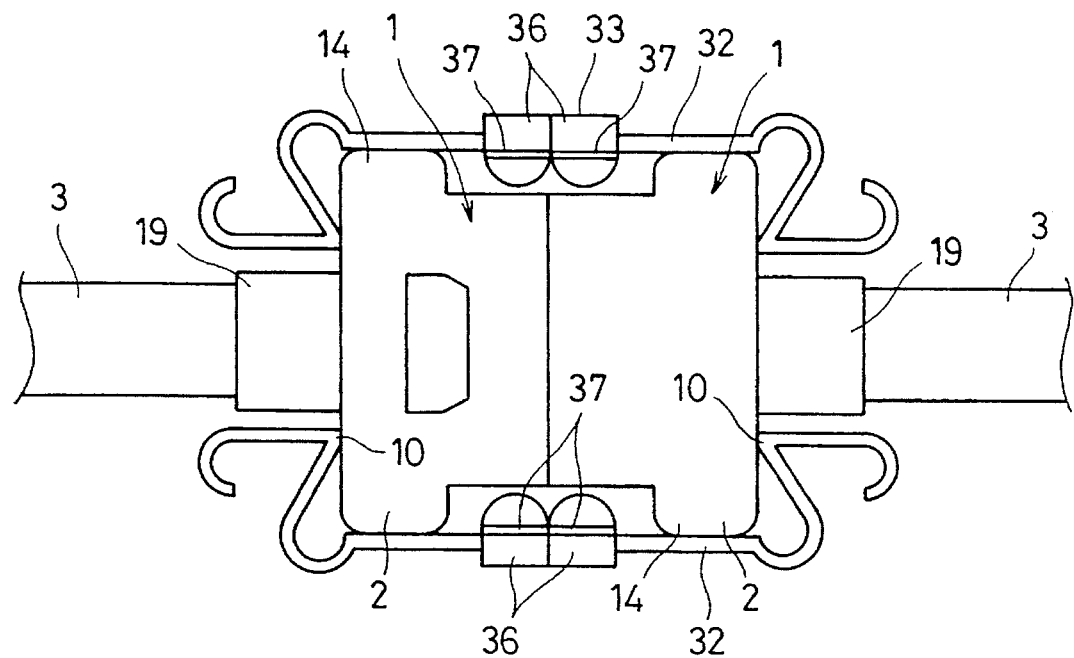
FIG. 4A is a plan view showing a pair of connected optical connectors and a clamp spring attached to the optical connector pair.
Figure 4B:
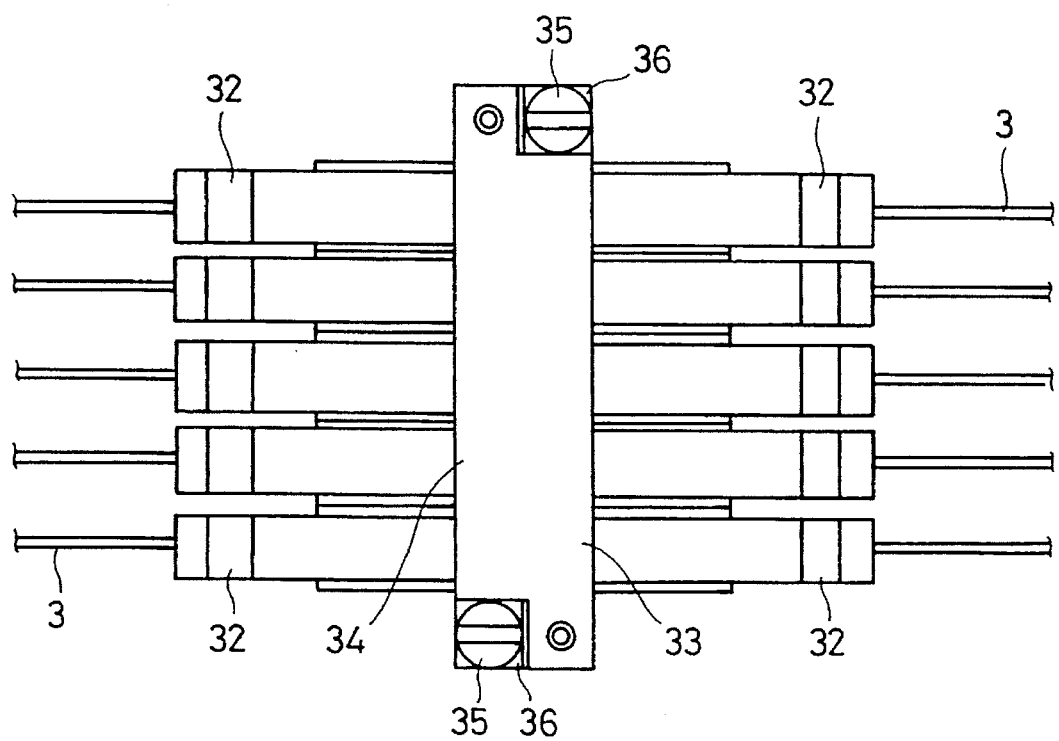
FIG. 4B is a side view of FIG. 4A.
Figure 28:
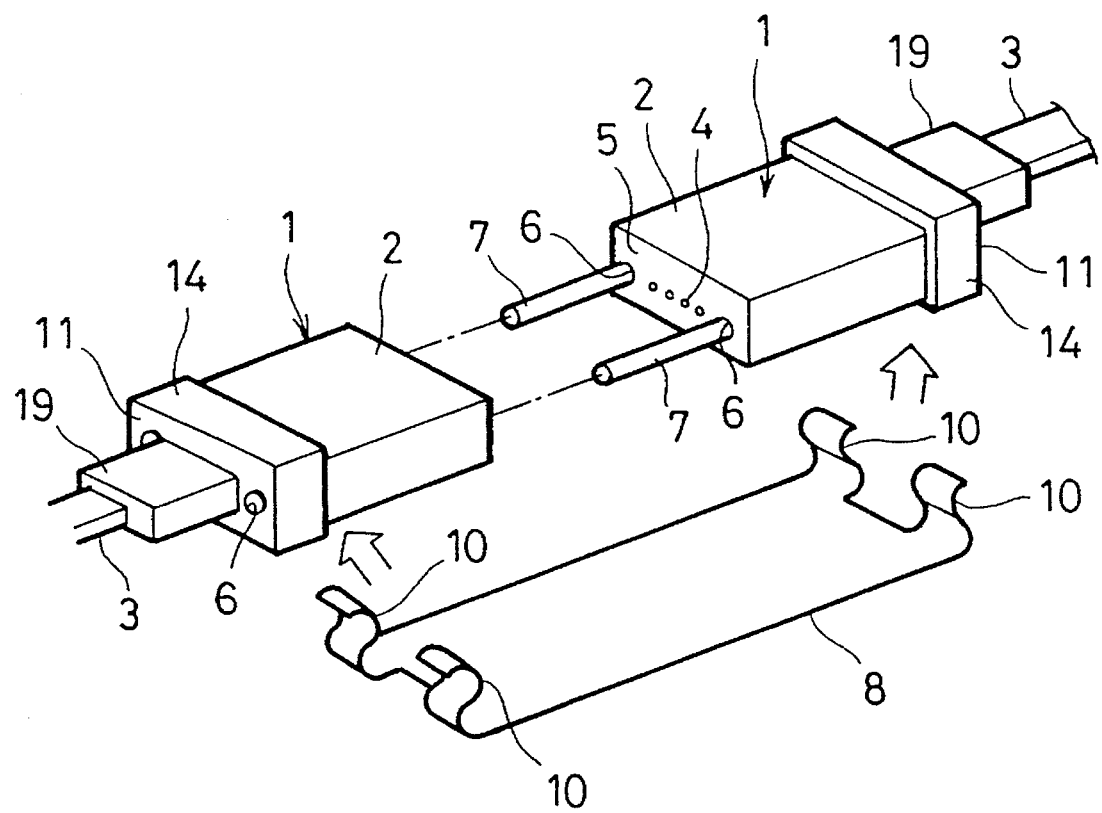
FIG. 28 is a perspective view showing the typical example of the connection of optical connectors.

To keep the optical connector pairs connected after the jig 16A is removed, a connection holding member is put over each pair of connected optical connectors. This connection holding member may be the clamp spring 8 as shown in FIG. 28. In this embodiment, a clamp spring 32 is attached to both sides of each optical connector pair as shown in FIG. 4 to keep those optical connectors connected.

The clamp spring 32 serves in the same manner as the conventional clamp spring 8, and spring-force applying portions 10 of the clamp spring 32 apply the force on the optical connectors 1 in the direction to press the connection end faces 5 against each other, thereby stably keeping the connection of the optical connectors 1,1. In this embodiment, a link member 33 is used to couple the individual clamp springs 32 to maintain the connected multiple optical connector pairs in the aligned state.

The link member 33 has a base plate 34 arranged on the sides of multiple optical connector pairs in the stacking direction and a pawl plate 36 attached to the upper and lower ends of the base plate 34 by screws 35. The pawl plate 36 extends toward the surface of the multifiber ferrule 2 on the upper end side of the base plate 34 and extends toward the back of the multifiber ferrule 2 on the lower end side of the base plate 34, with bent steps 37 provided midway of the extension for engagement with the clamp springs 32. The bent steps 37 respectively engage with the clamp springs 32 located on the upper and lower sides. Accordingly, the link member 33 securely couples the clamp springs 32 for the individual optical connector pairs together to keep the individual pairs of connected optical connectors in the aligned state.

When the screws 35 are loosened to remove the pawl plate 36 from the base plate 34 while the multiple optical connector pairs are kept connected, the individual clamp springs 32 are disengaged from one another. As a result, the multiple optical connector pairs can be separated pair by pair while maintaining the connected state.

The jig 16A of this embodiment allows multiple optical connectors 1 to be retained in the retainers 24 of the body 17 to be aligned and positioned. In this state, those optical connectors 1 are easily and collectively connected to another group of optical connectors 1, likewise aligned and positioned, the one-action operation of fitting the fitting pins 7 into the associated pin holes 6. This can significantly improve the working efficiency.

Since the jig 16A is designed to be removable after multiple optical connectors 1 are connected together, placing multiple optical connector pairs in a closure or the like, for example, requires less space by the removal of the jig 16A. That is, this embodiment can avoid using a larger closure and can retain pairs of optical connectors at high density, so that the embodiment can fully cope with a future demand for an increased number of connectors of an optical cable in an optical communications network.

Further, the jig 16A of this embodiment can be used not only at the time of factory shipment of optical connectors 1 in the connected state, but also on the spot of connecting the optical connectors, thus facilitating the collective connection of optical connectors on the spot.

Other embodiments of this invention will now be described. Same reference numerals as used for the first embodiment will also be used for the components of each of the jigs according to the embodiments to be discussed below, which have the same performances as those of the jig of the first embodiment, and thus their descriptions will be omitted.

Second Embodiment

Figure 5A:
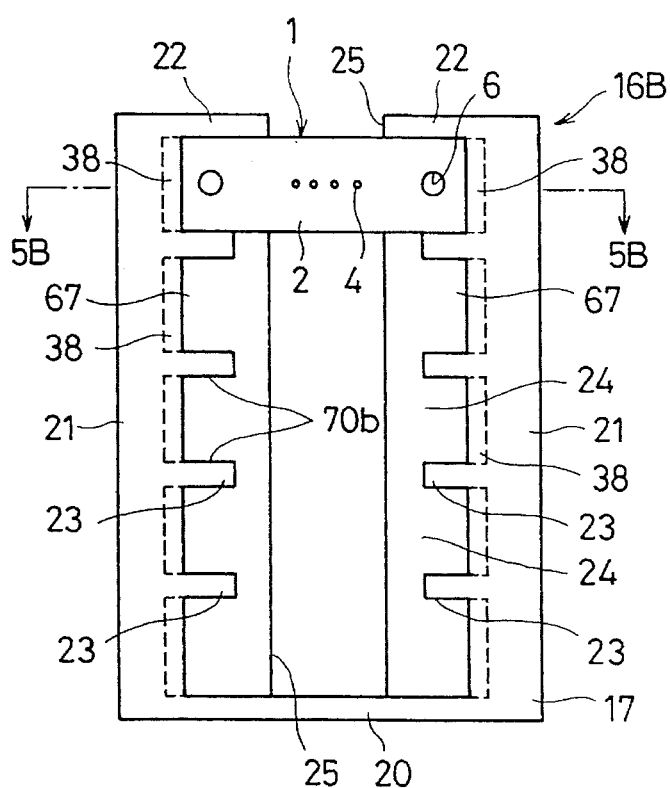
FIG. 5A is a front view of an aligning and positioning jig according to a second embodiment of this invention.
Figure 5C:
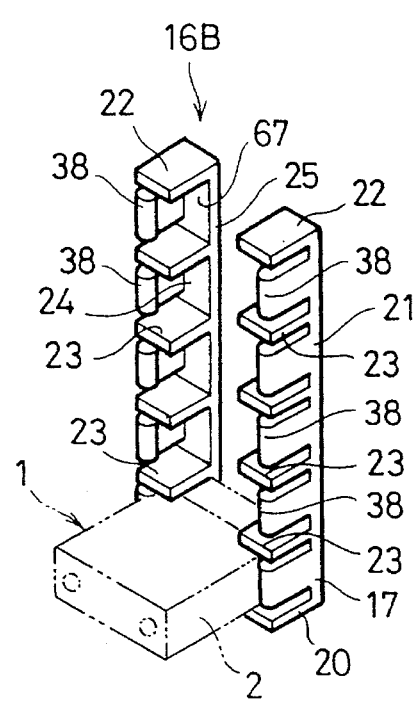
FIG. 5C is a perspective view of the aligning and positioning jig in FIG. 5A.
Figure 5B:
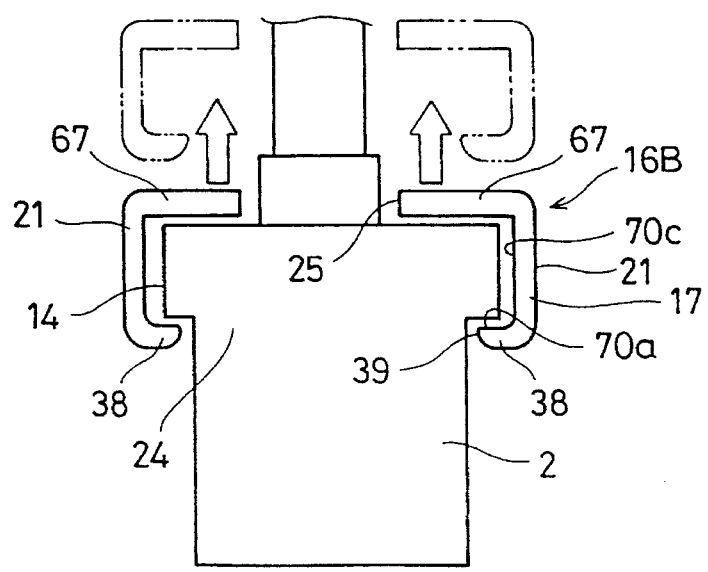
FIG. 5B is a plan view of FIG. 5A.

FIGS. 5A through 5C illustrate the second embodiment of this invention. A jig 16B of this embodiment has a body 17 which comprises a bottom plate 20, a pair of side plates 21 extending upright on the right and left sides of the bottom plate 20, a top plate 22 and a rear plate 67. A plurality of platforms 23 on which multifiber ferrules 2 of optical connectors are to be placed are formed at equal intervals in the vertical directions on the inner wall of each of the right and left side plates 21. A window 25 for the removal of protection boots 19 of the multifiber ferrules 2 and the multi-optical fiber ribbons 3 is formed in the center portions of the top plate 22 and a rear plate 67. The rear portions of the multifiber ferrules 2 or flanges 14 of the multifiber ferrules 2 are to be retained in retainers 24 of the body 17 of the jig 16B. Engaging pawls 38 for engagement with the distal end faces of flanges 14 are protrusively provided on the sides of each retainer 24, extending inward.

Each of multiple optical connectors 1 is inserted into an opening 39 formed between the engaging pawls 38,38 of each retainer 24 of the jig 16B of this embodiment from the rear side while pressing the engaging pawls 38 open. Each optical connector 1 is engaged with the engaging pawls 38 where the insertion is completed, so that the multiple optical connectors 1 are positioned and stacked one on another in the jig 16B.

Under this situation, after fitting pins 7 are fitted in pin holes 6 of the individual optical connectors 1, the connection end faces 5 are coated with matching oil, as in the first embodiment. Then, one group of optical connectors 1 positioned in the body 17 are collectively connected to another group of optical connectors 1 likewise positioned in another jig 16B by fitting the fitting pins 7 into the associated pin holes 6.

After the collective connection of multiple optical connectors 1 is made in this manner, the body 17 is pulled out rearward as indicated by the arrow in FIG. 5B. As a result, the engaging pawls 38 are widened to come over the outer surface of the flange 14 of each multifiber ferrule 2 so that the body 17 can be pulled out rearward from the multifiber ferrules 2.

Figure 6:
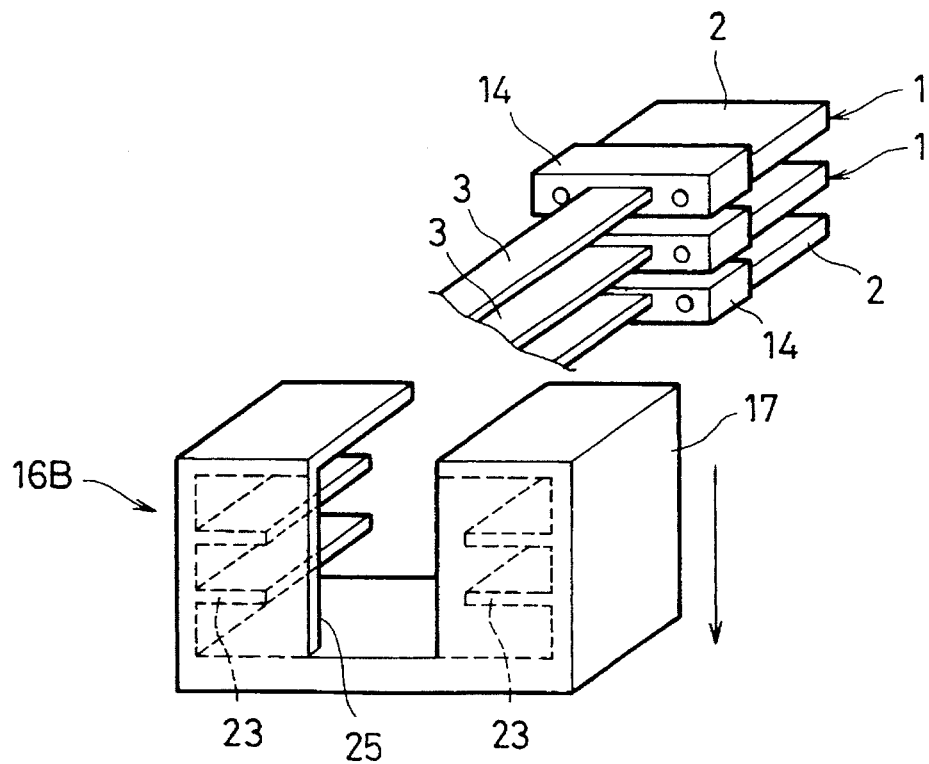
FIG. 6 is a perspective view for explaining the work of removing the aligning and positioning jig from multiple optical connectors connected.

Next, as the body 17 is moved downward as indicated by the arrow in FIG. 6, the multi-optical fiber ribbons 3 of the optical connectors 1 come out of the window 25 of the body 17, allowing the jig 16B to be detached from the connected multiple optical connectors.

The jig 16B of this embodiment can ensure the collective connection of multiple optical connectors 1 and can be detached from the connected optical connectors, and thus has the same advantages as the jig of the first embodiment. FIG. 6, unlike FIG. 5, shows the body 17 for three optical connectors 1 for the diagrammatic simplification.

Third Embodiment

Figure 7A:
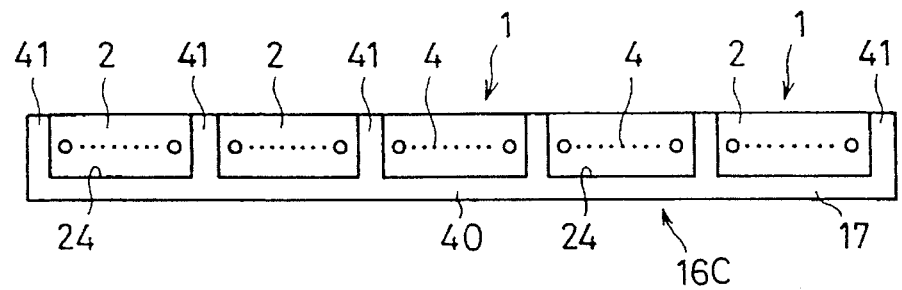
FIG. 7A is a front view of an aligning and positioning jig according to a third embodiment of this invention.
Figure 7B:
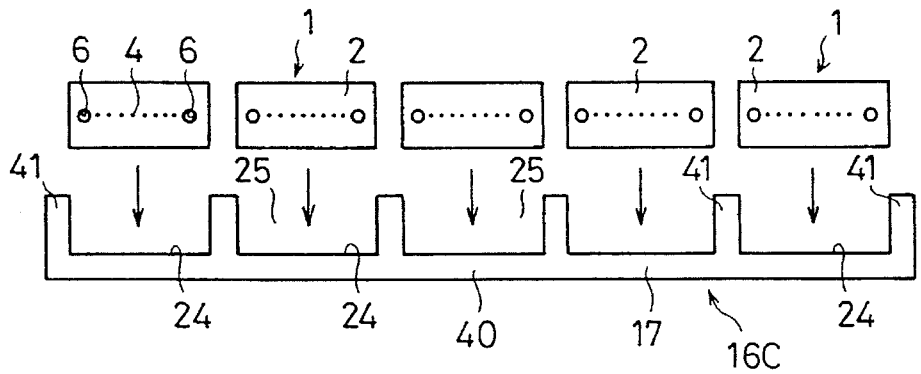
FIG. 7B is a front view illustrating a pair of connected optical connectors being removed from the jig in FIG. 7A.

FIGS. 7A and 7B illustrate a jig 16C according to the third embodiment of this invention. The jig 16C has a body 17, which comprises a bottom plate 40 and a plurality of partitions 41 provided at equal intervals from the bottom plate 40. The bottom plate 40 and partitions 41 form retainers 24 for optical connectors 1. The optical connectors 1 are retained in the associated retainers 24 and are aligned and positioned in the horizontal direction.

Under this situation, one group of optical connectors 1 are collectively connected to another group of optical connectors 1 by fitting the fitting pins 7 into the associated pin holes 6 as in the case of the aforementioned embodiments. Thereafter, the body 17 is moved downward to pull out the connected optical connectors 1 from a window 25 as shown in FIG. 7B.

Fourth Embodiment

Figure 8A:
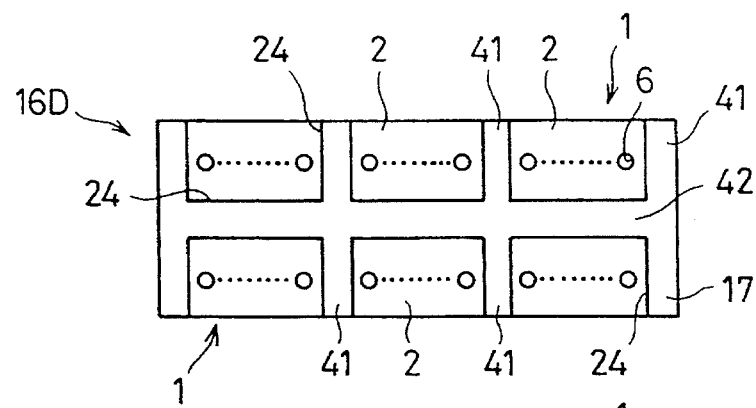
FIG. 8A is a front view of an aligning and positioning jig according to a fourth embodiment of this invention.
Figure 8B:
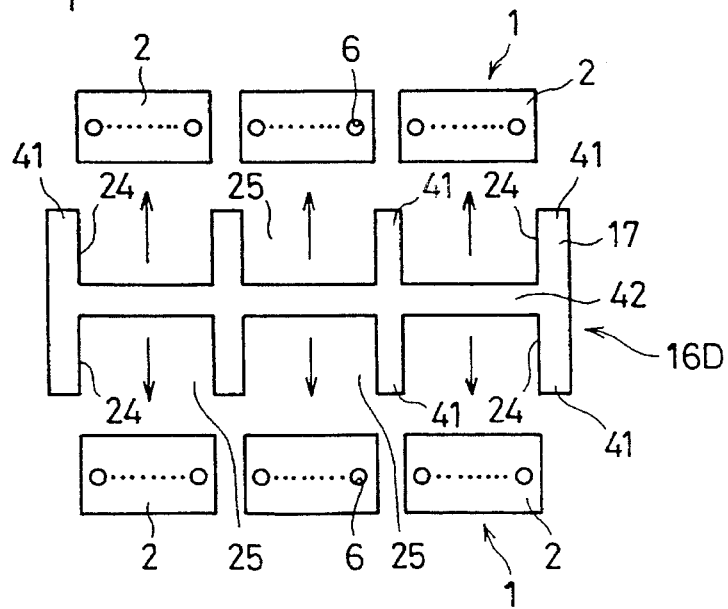
FIG. 8B is a front view illustrating a pair of connected optical connectors removed from the jig in FIG. 8A.

FIGS. 8A and 8B illustrate a jig 16D according to the fourth embodiment of this invention. The jig 16D has a plurality of partitions 41 provided on an intermediate plate 42 at equal intervals in the vertical direction, thereby defining a plurality of retainers 24 above and below the intermediate plate 42.

The optical connectors 1 are retained in the associated retainers 24 and are aligned and positioned in two stages, as shown in FIG. 8A. One group of optical connectors 1 aligned in this manner are collectively connected to another group of optical connectors 1 likewise aligned in another jig 16D by fitting pins 7 into associated pin holes 6, as in the above-described embodiments. Under this situation, each pair of optical connectors are pulled out from a window 25 of a retainer 24 so that the jig 16D is removed from the connected optical connector pairs.

Fifth Embodiment

FIGS. 9A and 9B illustrate a jig 16E according to the fifth embodiment of this invention. The jig 16E has recessed retainers 24 formed in the outer surface of a disk-like body 17. After multiple optical connectors 1 positioned and aligned in retainers 24 are collectively connected to another group of optical connectors 1, the optical connectors 1 are pulled out of a window 25 of the retainers 24 and the optical connectors 1 are removed from the jig 16E.

Sixth Embodiment

Figure 10A:
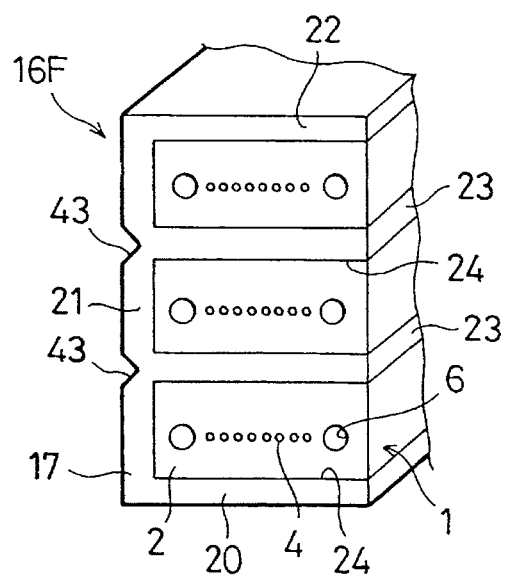
FIG. 10A is a perspective view of an aligning and positioning jig according to a sixth embodiment of this invention.
Figure 10B:
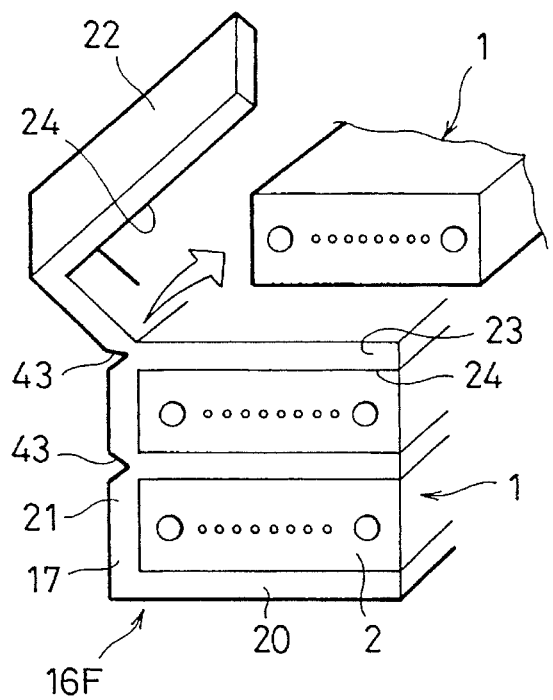
FIG. 10B is a perspective view illustrating optical connectors being removed from the jig in FIG. 10A.
Figure 10C:
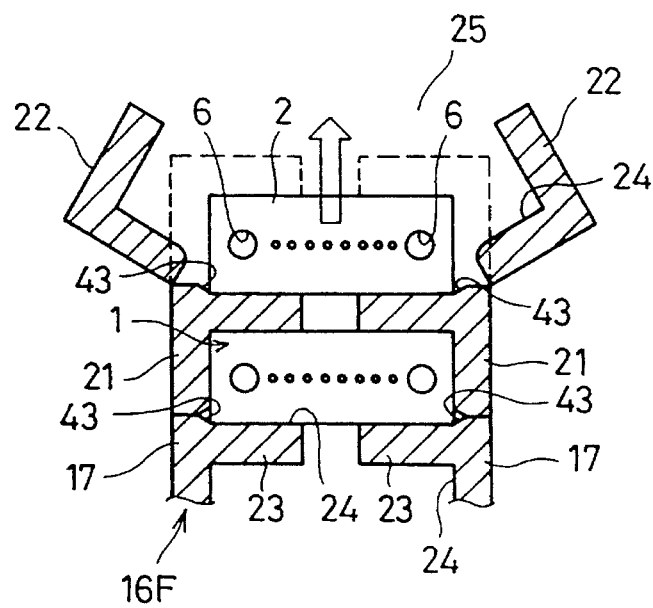
FIG. 10C is a perspective view showing a modification of the jig in FIG. 10A.

FIGS. 10A through 10C illustrate a jig 16F according to the sixth embodiment of this invention. A body 17 of the jig 16F comprises a bottom plate 20, side plates 21, a top plate 22 and platforms 23, which define retainers 24 for optical connectors 1. A hinge portion 43 is formed on the outer surface of each side plate 21 at a position where each platform 23 is formed.

The optical connectors 1 positioned and aligned in the respective retainers 24 of the jig 16F are collectively connected to another group of optical connectors 1 likewise aligned in another jig 16F. Thereafter, the side plates 21 are folded open outward at the uppermost hinge portions 43 together with the top plate 22 as shown in FIG. 10B, and then the connected optical connectors 1 are pulled out of the topmost retainers 24. The other connected optical connectors 1 are likewise sequentially pulled out of the other retainers 24, so that the jig 16F is removed from the connected optical connector pairs.

In this embodiment, as shown in FIG. 10C, the hinge portion 43 may be provided on the inner wall side, so that after positioned and aligned multiple optical connectors 1 are collectively connected, the right and left side plates 21 are folded open at the hinge portions 43 to allow the removal of the connected optical connectors 1.

Seventh Embodiment

Figure 11A:
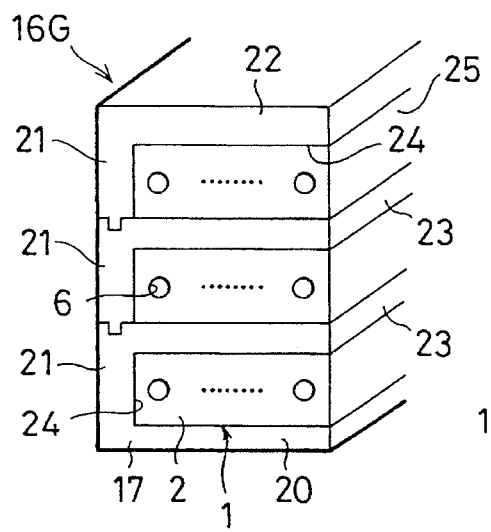
FIG. 11A is a perspective view of an aligning and positioning jig according to a seventh embodiment of this invention.
Figure 11B:
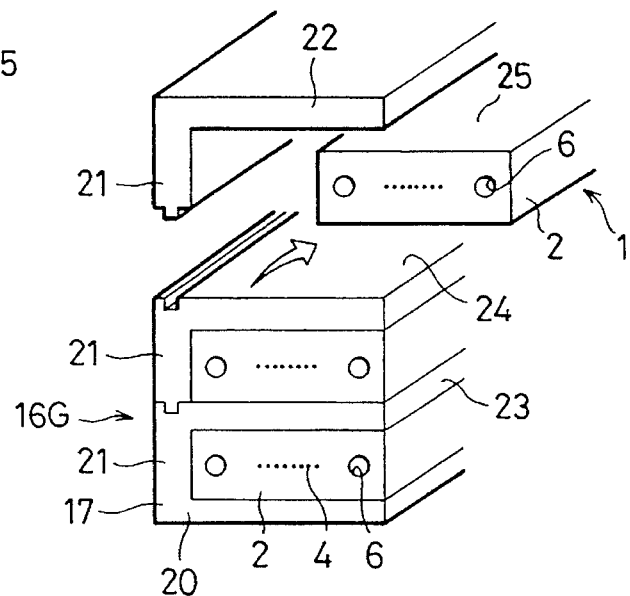
FIG. 11B is a perspective view illustrating optical connectors being removed from the jig in FIG. 11A.

FIGS. 11A and 11B illustrate a jig 16G according to the seventh embodiment of this invention. Instead of having the hinge portions 43 shown in FIGS. 10A to 10C, the jig 16G is so designed that a body 17 having its top plate 22 and side plates 21 integrated or platforms 23 and the side plates 21 integrated can be assembled by pressing-fitting the side plates 21 and disassembled on the side plate side.

Optical connectors 1 are retained in the respective retainers 24 of the jig 16G to be collectively connected to another group of optical connectors 1 as shown in FIG. 11A. Thereafter, the body 17 is disassembled on the side plate (21) side to remove the individual connected optical connector pairs as shown in FIG. 11B. As a result, the jig 16G is removed from the connected optical connector pairs.

The jig 16G may be designed like the jig 16F shown in FIG. 10c so that the body 17 can be broken up on both the right and left sides.

Eighth Embodiment

Figure 12A:
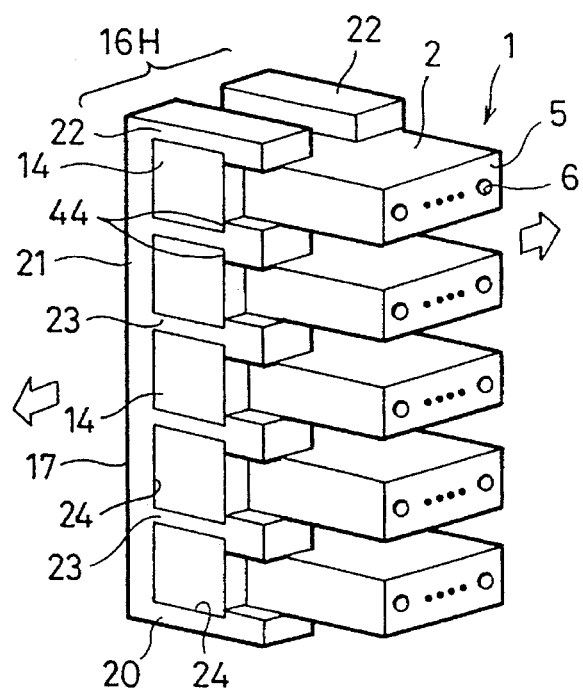
FIG. 12A is a perspective view of optical connectors placed one on another in an aligning and positioning jig according to an eighth embodiment of this invention.
Figure 12B:
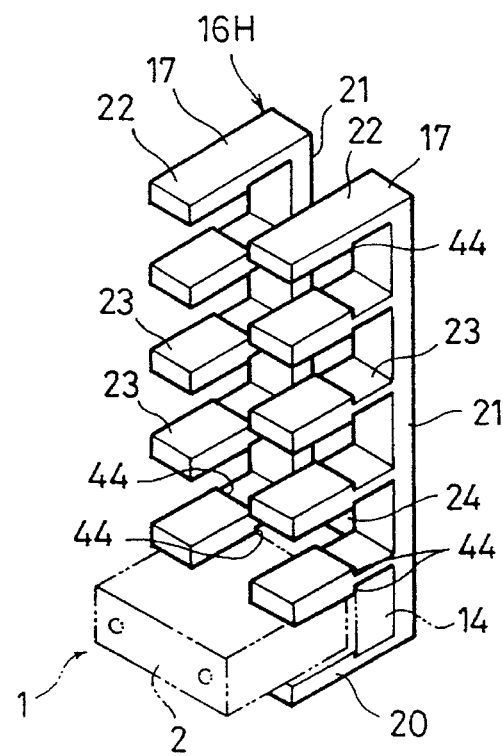
FIG. 12B is a perspective view showing the jig in FIG. 12A before optical connectors are placed one on another in the jig.

FIGS. 12A and 12B illustrate a jig 16H according to the eighth embodiment of this invention. The jig 16H has a pair of U-shaped bodies 17 each comprising a bottom plate 20, a side plate 21, a top plate 22 and platforms 23. Each body 17 has a plurality of retainers 24 defined by the bottom plate 20, top plate 22 and platforms 23. A step 44 which engages with the flange 14 of a multifiber ferrule 2 is provided on the side plate (21) side.

After the optical connectors 1 are placed one by one in the retainers 24, the flanges 14 of the jig 16H engage with the steps 44 as shown in FIG. 12B. In this manner, multiple optical connectors 1 are retained in the retainers 24 to be positioned and aligned as shown in FIG. 12A. After multiple optical connectors 1 are collectively connected in this state, the bodies 17 of the jig 16H are pulled out in the direction of the arrow in FIG. 12A. As a result, the jig 16H is removed from the connected multiple optical connector pairs.

In removing the body 17, a pair of bodies 17 are removed one by one, not simultaneously. Next, clamp springs 32 are attached to the sides of removed multiple optical connector pairs on one body 17, and then the other body 17 is removed. Then, the clamp springs 32 are attached to the sides of the other removed group of optical connectors. In this manner, the jig 16H is completely removed from the connected optical connector pairs.

Although the jig 16H has a pair of bodies 17, it is still possible to align and position multiple optical connectors 1 using a single body 17.

Ninth Embodiment

Figure 13A:
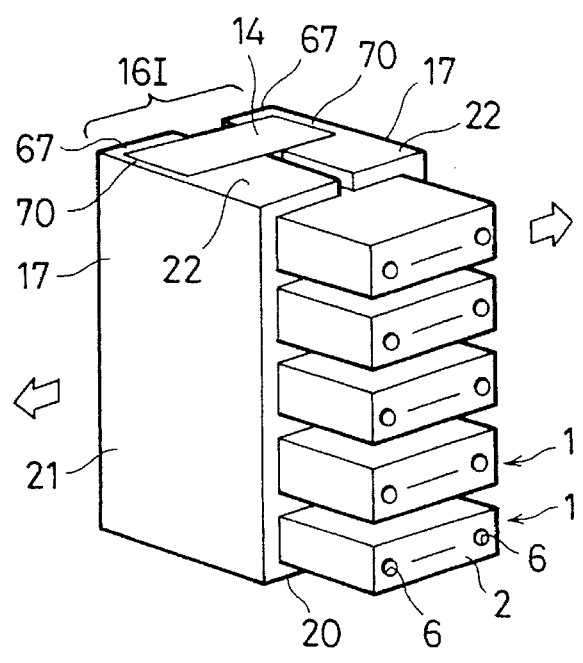
FIG. 13A is a perspective view of optical connectors placed one on another in an aligning and positioning jig according to a ninth embodiment of this invention.
Figure 13B:
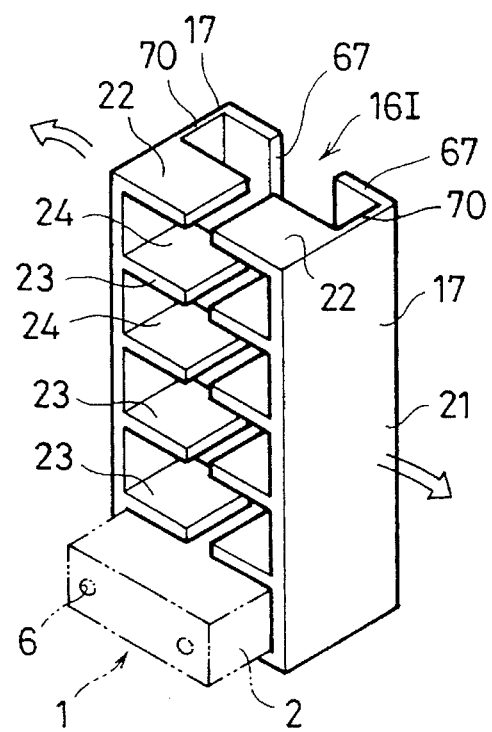
FIG. 13B is a perspective view showing the jig in FIG. 13A before optical connectors are placed one on another in the jig.
Figure 13C:
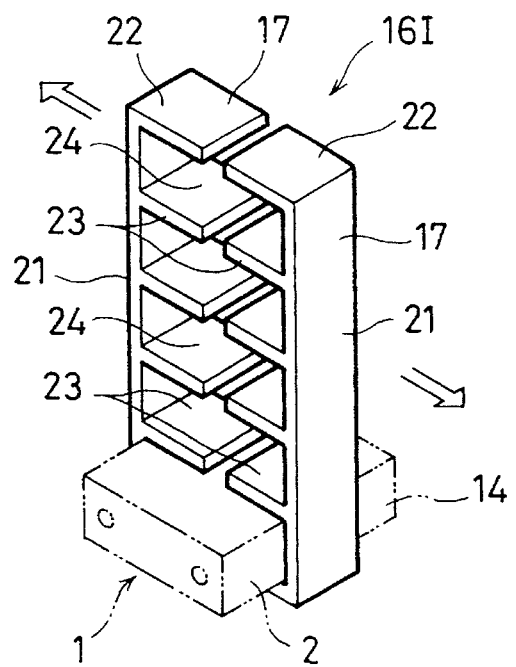
FIG. 13C is a perspective view showing a modification of the jig in FIG. 13A.

FIGS. 13A to 13C illustrate the ninth embodiment of this invention.

A jig 16I according to this embodiment has a rear plate 67 formed by bending a side plate 21, and a pair of U-shaped bodies 17 each comprising a bottom plate 20, the side plate 21, a top plate 22 and platforms 23. Each body 17 has a plurality of retainers 24 defined by the bottom plate 20, top plate 22 and platforms 23.

The rear portions of optical connectors 1 are retained in the retainers 24 of the jig 16I with the pair of bodies 17 facing each other in the right and left sides as shown in FIG. 13A, and then the multiple optical connectors 1 are positioned and aligned as shown in FIG. 13B. After the multiple optical connectors 1 are collectively connected in this state, the bodies 17 are pulled in the directions of the arrows in FIG. 13B. As a result, the jig 16I is removed from the connected optical connector pairs.

U-shaped engage portions 70 which engage with each other with flanges 14 of the optical connectors 1 in between are formed by the side plates 21, rear plates 67 and top plates 22 (or platforms 23 or bottom plates 20) of the bodies 17 of the jig 16I. Accordingly, the jig 16I can surely hold multiple optical connectors 1 and properly connect them at the time of collective connection.

The body pair 17 of the jig 16I may be removed one at a time and clamp springs 32 may be attached to the optical connectors 1 after each removal as in the eighth embodiment. Alternatively, the clamp springs 32 may be attached to the right and left sides of the optical connectors 1 after the pair of body pair 17 are completely removed.

Although the jig 16I of this embodiment is constructed by the pair of bodies 17, the jig 16I may be designed to have just a single body 17 to properly align and position multiple optical connectors 1 as in the eighth embodiment.

Further, the jig 16I may be designed with no U-shaped engage portions 70 as shown in FIG. 13C.

In the foregoing descriptions of the embodiments, various examples of the positioning and alignment and the collective connection of multiple optical connectors 1 using the multifiber ferrules 2 having the shape as shown in FIG. 14A have been explained. It should be noted that the multifiber ferrule 2 constituting each optical connector 1 is not limited to have the shape shown in FIG. 14A, but may take various other shapes such as the one shown in FIG. 14B whose flange 14 having a front face 14a extends sideward and the one shown in FIG. 14C whose flange 14 protrudes upward and downward.

Tenth Embodiment

Figure 15:
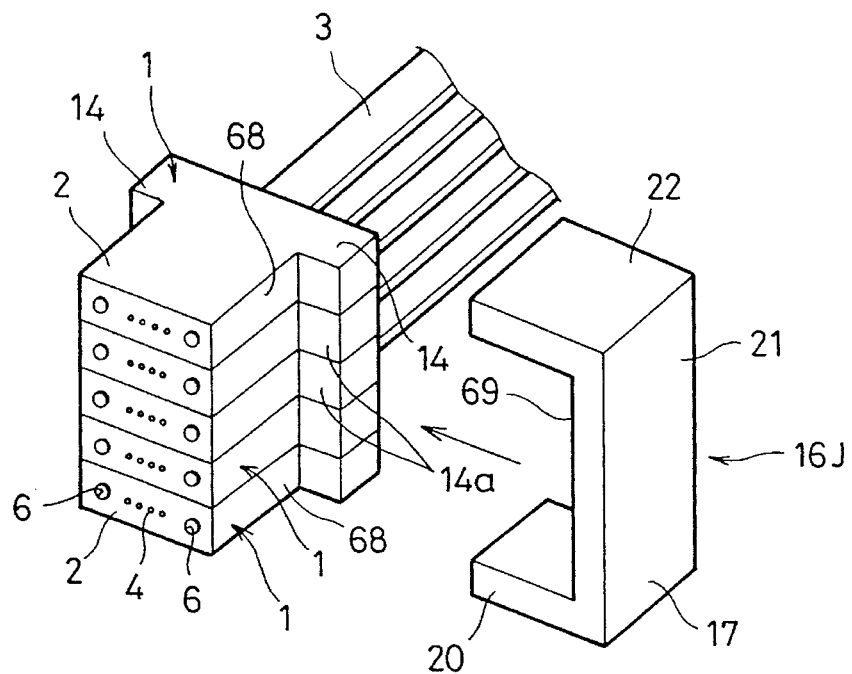
FIG. 15 is a perspective view of an aligning and positioning jig according to a tenth embodiment of this invention.

FIG. 15 illustrates a jig 16J according to the tenth embodiment of this invention, which collectively connects multiple optical connectors 1 each using the multifiber ferrule 2 shown in FIG. 14B.

The jig 16J has a U-shaped body 17.

The body 17 of the jig 16J is attached to the ferrule bodies of a plurality of stacked optical connectors 1 so as to sandwich them from the side, as shown in FIG. 15. The end face of the body 17 engages with front end faces 14a of flanges 14 of multifiber ferrules 2, and a side face 69 of the body 17 engages with side faces 68 of the ferrule bodies of the ferrules 2.

Accordingly, one group of optical connectors 1 positioned and aligned in this manner, and are collectively connected to another group of optical connectors 1 likewise aligned and positioned by fitting pins 7 into associated pin holes 6, as in the above-described embodiments. After the collective connection, the body 17 is pulled out in the direction opposite to the arrow to remove the jig 16J from the connected optical connector pairs.

Eleventh Embodiment

Figure 16:
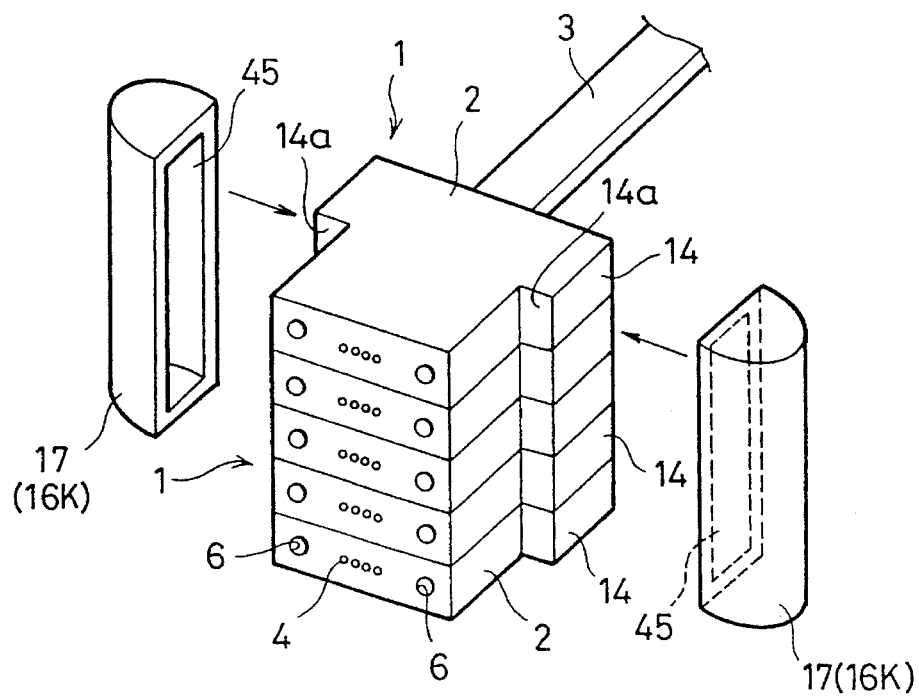
FIG. 16 is a perspective view of an aligning and positioning jig according to an eleventh embodiment of this invention.

FIG. 16 illustrates one example of the collective connection of optical connectors 1 using the multifiber ferrule 2 as shown in 14B. A jig 16K is constituted of a pair of bodies 17 which hold flanges 14 of the stacked multiple optical connectors 1 from both right and left sides.

Each body 17 is shaped like an elongated box which has a fitting hole 45 where the ends of multiple flanges 14 of stacked multifiber ferrules 2 are fitted and held. The pair of the bodies 17 of the jig 16K are fitted on the ends of the flanges 14 of the stacked multiple multifiber ferrules 2 from the right and left sides to position and align the multiple optical connectors 1.

After the multiple optical connectors 1 are collectively connected in this aligned state, the bodies 17 are pulled out in the directions opposite to the arrows so that the jig 16K can easily be removed from the connected optical connector pairs.

Twelfth Embodiment

Figure 17A:
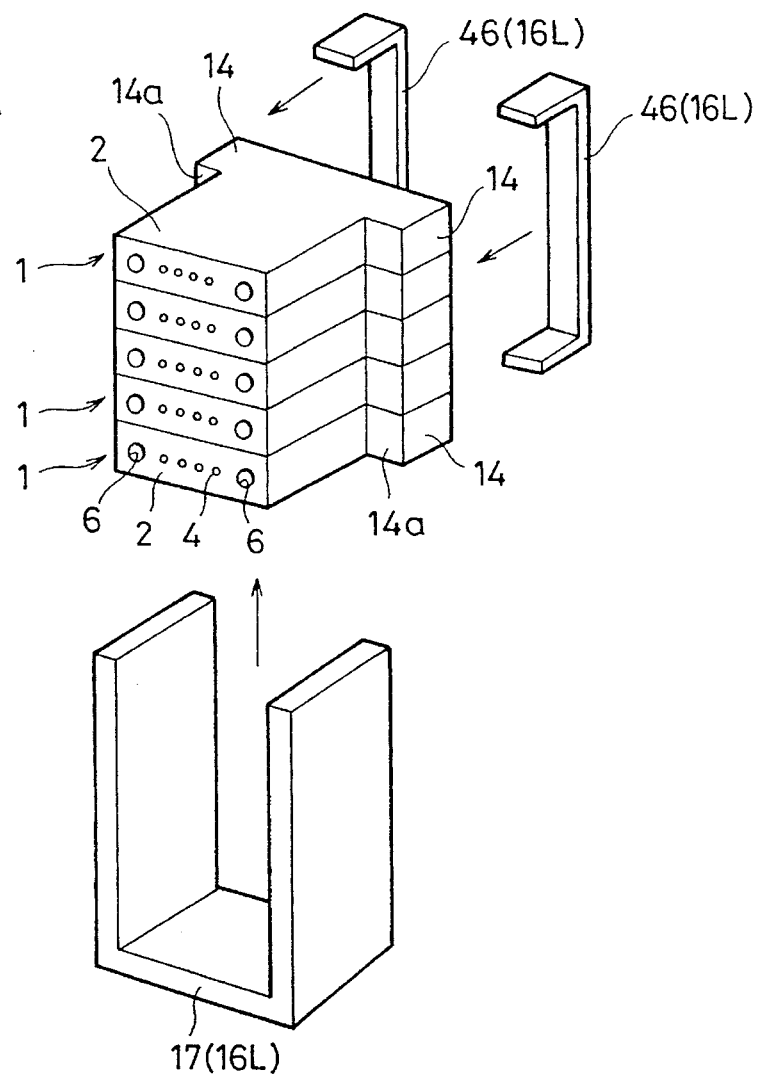
FIG. 17A is a perspective view of an aligning and positioning jig according to a twelfth embodiment of this invention.
Figure 17B:
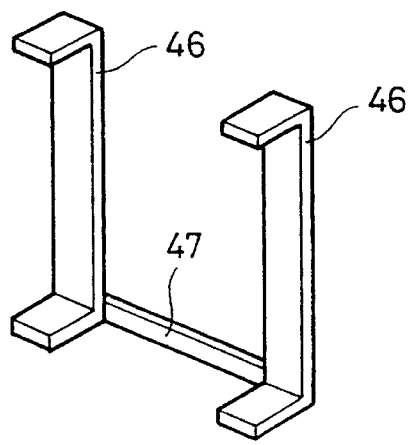
FIG. 17B is a perspective view showing a modification of a frame used for jig in FIG. 17A.

FIGS. 17A and 17B illustrate a jig 16L according to the twelfth embodiment of this invention. This embodiment also relates to one example of a method of collectively connecting the optical connectors 1 using the multifiber ferrules 2 shown in FIG. 14B.

The jig 16L comprises a pair of U-shaped frames 46 and a U-shaped body 17, as shown in FIG. 17A. The pair of frames 46 of the jig 16L are attached to the multifiber ferrules 2 of multiple stacked optical connectors 1 from the rear side, and the body 17 is fitted on the multifiber ferrules 2 from the bottom side as indicated by the upward arrow so as to hold the ferrule bodies from the right and left sides. With this structure, the multiple optical connectors 1 engage with the inner wall and end face of the body 17 to be positioned and aligned.

The multiple optical connectors 1 are collectively connected to another group of optical connectors 1 likewise aligned by another jig 16L in this state. After this collective connection, the frames 46 and the body 17 are pulled out in the directions opposite to the arrows in FIG. 17A to easily remove the jig 16L from the connected multiple optical connector pairs.

It should be noted that a pair of frames 46 are separately formed in this embodiment, but a pair of frames 46 may be coupled by a link plate 47 to become one unit as shown in FIG. 17B.

The method of positioning and aligning multiple optical connectors 1 and collectively connecting the multiple optical connectors 1 using the multifiber ferrules 2 shown in FIG. 14B is not limited to those illustrated in FIGS. 15A through 17B. The optical connectors 1 may be aligned and positioned and collectively connected by the methods as shown in FIGS. 1 to 13, which are used to collectively connect optical connectors using the multifiber ferrules 2 as shown in FIG. 14A.

Thirteenth Embodiment

Figure 18:
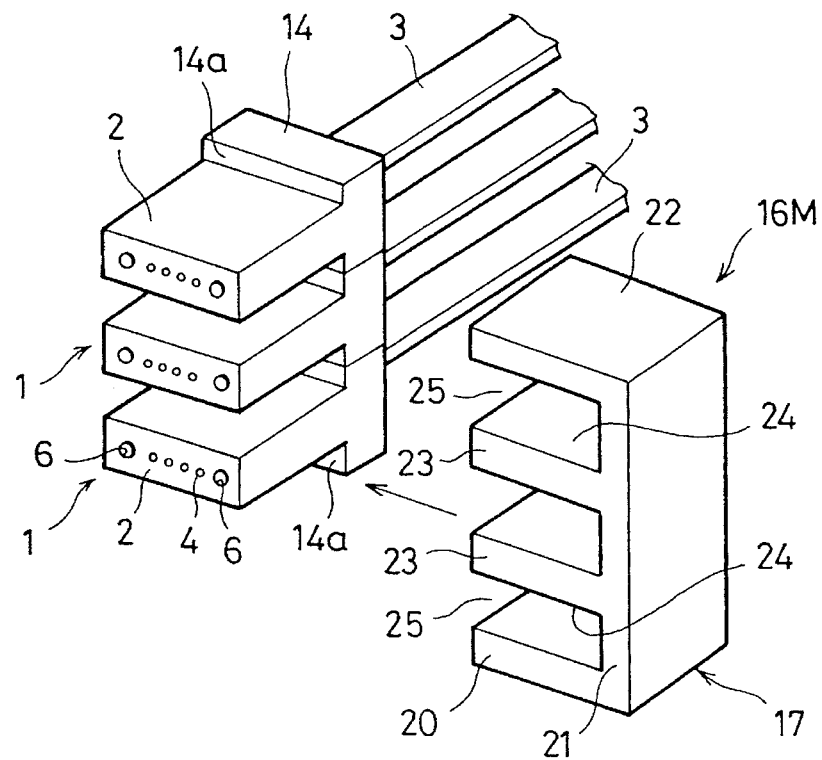
FIG. 18 is a perspective view of an aligning and positioning jig according to a thirteenth embodiment of this invention.

FIG. 18 illustrates a jig 16M according to the thirteenth embodiment of this invention. This embodiment also relates to a method of positioning and aligning and collectively connecting the optical connectors 1 using the multifiber ferrules 2 shown in FIG. 14C.

The jig 16M has a plurality of platforms 23 provided on a U-shaped body 17. Individual optical connectors 1 are retained in retainers 24 of the body 17. The jig 16M positions and aligns multiple optical connectors 1 in the respective retainers 24. After the multiple optical connectors 1 are collectively connected to another group of optical connectors 1 in this state, the body 17 is pulled out in the direction opposite to the arrow in the diagram to be easily removed from the connected optical connector pairs.

The method of positioning and aligning multiple optical connectors 1 and collectively connecting the multiple optical connectors 1 using the multifiber ferrules 2 shown in FIG. 14C is not limited to the one illustrated in FIG. 18, but multiple optical connectors 1 may also be aligned and positioned and collectively connected by using the methods as shown in FIGS. 1 to 13.

Fourteenth Embodiment

Figure 19:
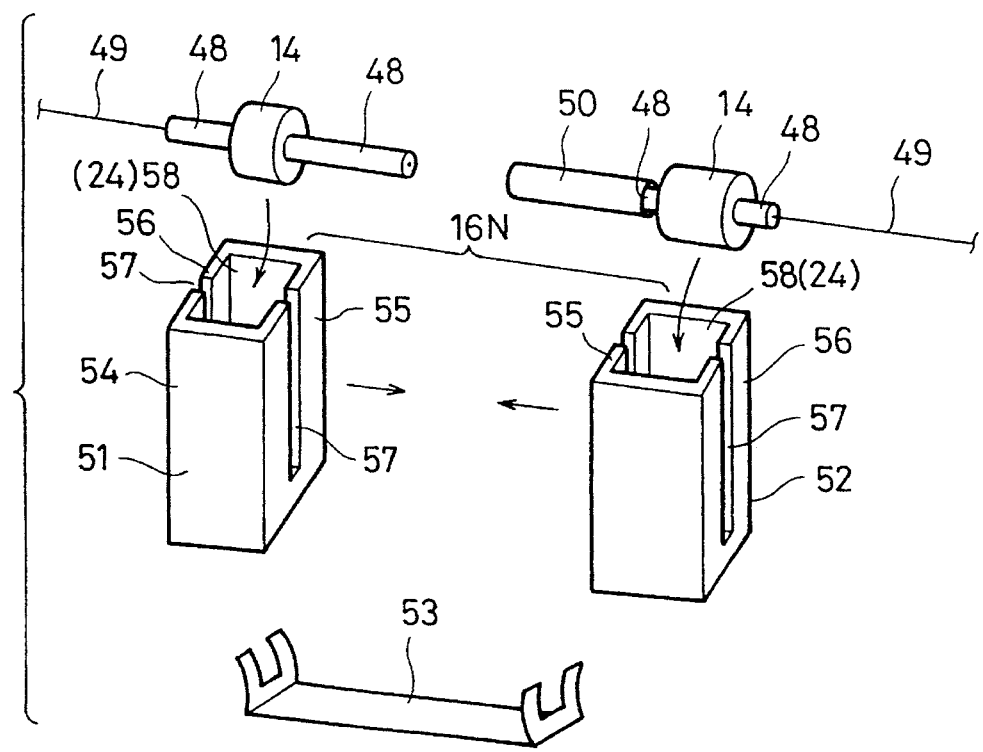
FIG. 19 is a perspective view of an aligning and positioning jig according to a fourteenth embodiment of this invention.

FIG. 19 illustrates a jig 16N according to the fourteenth embodiment of this invention. This embodiment is also used to position and align single-optical connectors and collectively connect the positioned and aligned optical connectors.

There are two types of optical connectors: a male optical connector having an optical fiber 49 securely inserted into the fiber hole of a pin-shaped ferrule 48 having a cylindrical flange 14, and a female optical connector having a split sleeve 50 previously fitted on the ferrule 48.

The jig 16N has a first body 51 and a second body 52. The first body 51 has a frame 54 with an elongated box shape with an open top and has slits 57 formed in front and rear walls 55 and 56 of the frame 54. A hole 58 in the center of the frame 54 serves as a retainer for the cylindrical flange 14, and the slits 57 serve as grooves where the ferrule 48 of the male optical connector is to be inserted. As the ferrules 48 of the male optical connectors are inserted in the slits 57, the cylindrical flanges 14 are retained in the retainer 24 so that the multiple male optical connectors are stacked one on another. In the stacked state, the flanges 14 engage with the inner walls of the front and rear walls 55 and 56 of the frame 54 and the multiple ferrules 48 engage with both walls of the slits 57. Thus, those ferrules 48 are positioned and aligned.

Likewise, the ferrules 48 of the female optical connectors are positioned and aligned by fitting the ferrules 48 in the slits 57 of the second body 52 having the same shape as the first body 51 and placing the cylindrical flanges 14 in the hole 58 (retainer 24) of the frame 54. As the distal ends of the ferrules 48 of the male optical connectors are inserted into the associated split sleeves 50 of the female optical connectors in this state, multiple male optical connectors are collectively connected to multiple female optical connectors through one-fitting operation. When the male optical connectors and female optical connectors are pulled out of the holes 58 (retainers 24) of the first and second bodies 51 and 52 in this connected state, or when the first and second bodies 51 are pulled downward in the state shown in FIG. 19, the jig 16N is detached from the connected multiple optical connector pairs.

After the removal of the jig 16N, a spring clip 53 is attached to the rear portions of the cylindrical flanges 14 of the male optical connector and female optical connector. As a result, the connection end faces of the male optical connector and female optical connector are pressed toward each other by the elastic restoring force of the spring clip 53, thereby stably keeping the male optical connector and female optical connector connected.

Fifteenth Embodiment

A jig 16P according to the fifteenth embodiment of this invention will now be described with reference to FIGS. 20A, 20B and 21A–21C.

The jig 16P is designed in substantially the same way as the jig 16I of the ninth embodiment shown in FIGS. 13A and 13B. The different point of the jig 16P from the jig 16I however lies in that hemispherical projections 80 are provided on the inner wall of the rear plates 67 (the area of individual retainers 24 for optical connectors 1) which are formed by folding the side plates 21.

The projections 80 are provided at positions corresponding to the pin holes 6 in the rear end faces 11 of the optical connectors 1. When the optical connectors 1 are placed in the retainers 24, at least the distal ends of the projections 80 are fitted in the pin holes 6, thereby positioning the optical connectors 1 with respect to the retainers 24.

The jig 16P with the above-described structure positions and aligns optical connectors 1 whose rear ends are retained in the respective retainers 24, in the same way as done in the ninth embodiment. The removal of the jig 16P after the collective connection of the optical connectors 1 is accomplished in the same manner as done in the ninth embodiment.

At the time of positioning the optical connectors 1, the individual projections 80 of the jig 16P of this embodiment are fitted in the pin holes 6 of the optical connectors 1 to position the optical connectors 1 as shown in FIGS. 21A and 21B. Unlike in the case where the optical connectors 1 are retained in the retainers 24 having no projections 80 as shown in FIG. 21C, therefore, even when the thickness A of the ferrule bodies of the optical connectors 1 to be retained is small, the optical connectors 1 would not be accommodated in the retainers 24 eccentric in the thickness direction, but should always be placed at the proper positions (e.g., the center portions) of the retainers 24.

According to the jig 16P, the projections 80 are fitted in the associated pin holes 6 of the optical connectors 1 and the optical connectors 1 are retained in the retainers 24 with their rear end faces 11 pressed against the rear plates 67. Accordingly, the jig 16P can prevent the fitting pins 7, which are to be fitted in the pin holes 6, from extending from the rear end faces 11 of the optical connectors 1 and can suppress the optical connectors 1 from coming off the body 17 before the optical connectors 1 are collectively connected. It is therefore possible to more stably and surely execute the collective connection of multiple optical connectors.

Sixteenth Embodiment

Figure 22:
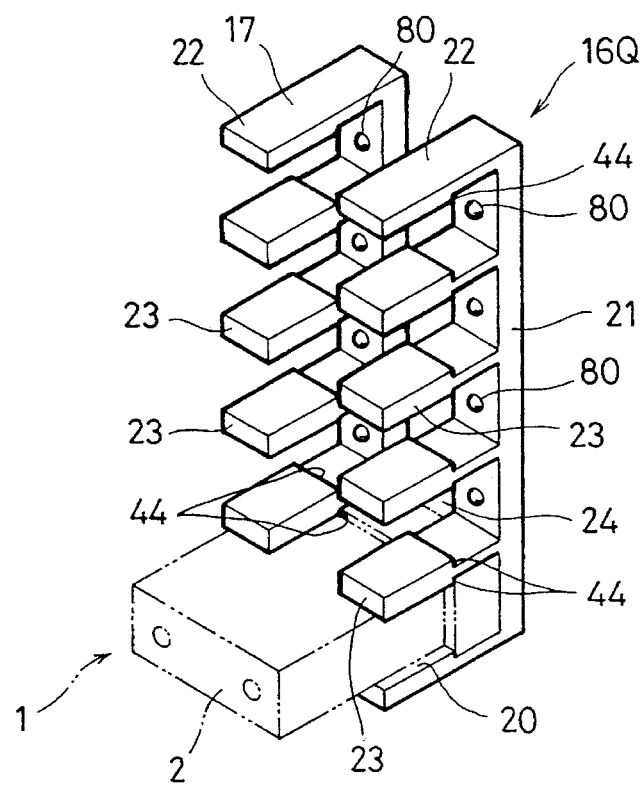
FIG. 22 is a perspective view of an aligning and positioning jig according to a sixteenth embodiment of this invention.

FIG. 22 illustrates a jig 16Q according to the sixteenth embodiment of this invention. The jig 16Q is designed in substantially the same way as the jig 16H of the eighth embodiment shown in FIGS. 12A and 12B. The different point of the jig 16Q from the jig 16H of the eighth embodiment however lies in that hemispherical projections 80 are provided on the side plates 21. The projections 80, like those of the fifteenth embodiment, are provided at positions corresponding to the pin holes 6 in the rear portions of the optical connectors 1 to be retained in the retainers 24. The optical connectors 1 are positioned in the retainers 24 by fitting at least the distal ends of the projections 80 in the associated pin holes 6.

The jig 16Q with the above-described structure functions in the same way as the jig 16H of the eighth embodiment and has the same advantages as the jig 16H. The provision of the projections 80 can ensure the positioning of the optical connectors 1, as in the case of the jig 16P of the fifteenth embodiment. Accordingly, the jig 16Q can prevent the fitting pins 7 from extending from the rear end faces 11 of the optical connectors 1 and can prevent the optical connectors 1 from coming off the body 17 before the optical connectors 1 are collectively connected. It is therefore possible to stably and surely execute the collective connection of multiple optical connectors.

Seventeenth Embodiment

Figure 23:
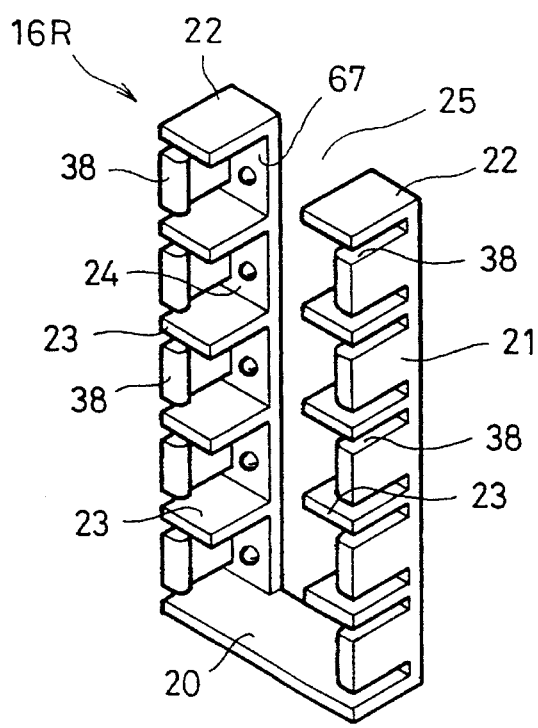
FIG. 23 is a perspective view of an aligning and positioning jig according to a seventeenth embodiment of this invention.

FIG. 23 illustrates a jig 16R according to the seventeenth embodiment of this invention. The jig 16R is designed in substantially the same way as the jig 16B of the second embodiment shown in FIGS. 5A to 5C. The different point of the jig 16R from the jig 16B of the second embodiment however lies in that hemispherical projections 80, which function in the same way as the projections 80 of the fifteenth and sixteenth embodiments, are provided on the rear plates 67. The projections 80 are provided at positions corresponding to the pin holes 6 in the rear portions of the optical connectors 1 to be retained in the retainers 24.

The jig 16R of this embodiment functions in the same way as the jig 16B of the second embodiment and has the same advantages as the jig 16B. Further, the provision of the projections 80 provides the same advantages as obtained by the fifteenth and sixteenth embodiments.

Eighteenth Embodiment

Figure 24A:
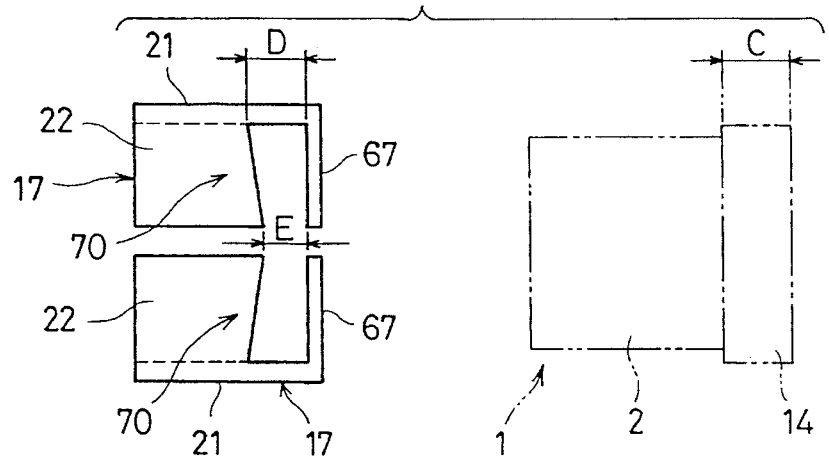
FIG. 24A is a plan view showing the essential portions of an aligning and positioning jig according to an eighteenth embodiment of this invention.
Figure 24B:
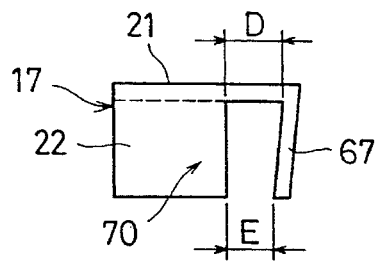
FIG. 24B is a plan view showing a modification of a jig body used for the jig in FIG. 24A.
Figure 24C:
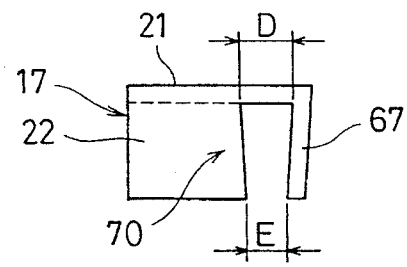
FIG. 24C is a plan view showing another modification of a jig body used for the jig in FIG. 24A.

FIGS. 24A through 24C are plan views of a jig according to the eighteenth embodiment of this invention. The jig of this embodiment is designed in substantially the same way as the jig 16I of the ninth embodiment shown in FIGS. 13A and 13B. The different point of the jig of this embodiment from the jig 16I of the ninth embodiment lies in that the opening width E of an engage portion 70 shown in FIGS. 24A and 24B is set smaller than the width C of the flange 14. The rear end plates 67 are elastic plates and the retaining width D of the U-shaped engage portion 70 is set substantially equal to the width C of the flange 14 of the optical connector 1 in this embodiment.

As shown in FIG. 24A, the top plate 22 may be formed inclined to set the opening width E of the engage portion 70 smaller than the retaining width D. Alternatively, the rear plates 67 may be formed inclined as shown in FIG. 24B, or both the top plate 22 and the rear plates 67 may be formed inclined as shown in FIG. 24C so as to set the opening width E smaller than the retaining width D.

The jig of this embodiment with the above-described structure functions in the same way as the jig 16I of the ninth embodiment to position and align the optical connectors with the rear portions retained in the respective retainers 24.

According to the jig of this embodiment, the opening width E of the engage portion 70 is set smaller than the width C of the flange 14 of the optical connector 1 and the rear plates 67 are elastic plates. When the body 17 is attached to the multiple optical connectors 1 from the sides to retain the optical connectors in the retainers 24, the rear end plates 67 of the engage portion 70 are widened by the flange 14 of each optical connector 1, and then the body 17 is inserted in the retainers 24. Consequently, the optical connectors 1 are pressed against the rear end plates 67 to be positioned and aligned.

According to the jig of this embodiment, the optical connectors 1 are surely positioned by the elastic restoring force of the rear plates 67. As a result, the body 17 is prevented from coming off the optical connectors 1, thus permitting multiple optical connectors 1 to be collectively connected more surely.

Nineteenth Embodiment

Figure 25:
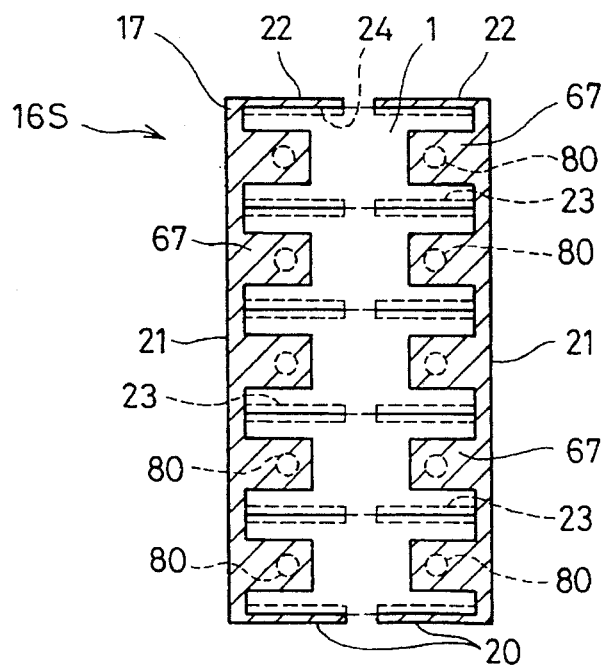
FIG. 25 is a rear view of an aligning and positioning jig according to a nineteenth embodiment of this invention.

FIG. 25 is a rear view of a jig 16S according to the nineteenth embodiment of this invention, illustrating optical connectors 1 retained in the associated retainers 24 of a body 17.

The jig 16S is designed in substantially the same way as the jig of the eighteenth embodiment. The different point of the jig 16S from the jig of the eighteenth embodiment however lies in that the rear plates 67 are independently provided for the respective retainers 24 and hemispherical projections 80, which serve in the same way as the projections 80 of the jigs 16P to 16R of the fifteenth to seventeenth embodiments are provided on the inner walls of the independent rear plates 67.

The projections 80, like those of the fifteenth to seventeenth embodiments, are provided at positions corresponding to the pin holes 6 in the rear portions of the optical connectors 1 to be retained in the retainers 24.

The jig 16S of this embodiment with the above-described structure functions in the same way as the jig of the eighteenth embodiment and has the same advantages as the latter jig. When the rear plates 67 as elastic plates are independently provided for the respective retainers 24 as in this embodiment, the flanges 14 of the individual optical connectors 1 can properly the pressed by the elastic restoring forces of the rear plates 67 in association with the optical connectors 1 to be retained in the retainers 24. Therefore, the jig 16S can position and align optical connectors 1 more appropriately than the jig of the eighteenth embodiment.

Because of the projections 80 provided on the rear plates 67, the jig 16S of this embodiment, like the jigs 16P to 16R of the fifteenth to seventeenth embodiments, can properly position the individual optical connectors 1 into the associated retainers 24. Therefore, the jig 16S can position and align the individual optical connectors very accurately and can stably and surely accomplish the collective connection of the multiple optical connectors 1.

Figure 26:
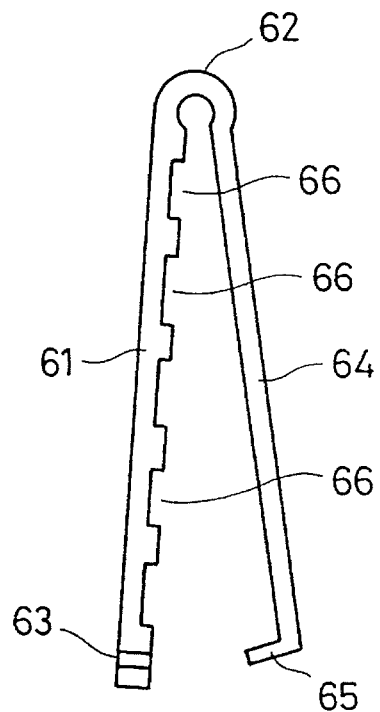
FIG. 26 is a front view showing another example of a link member for coupling a clamp spring used in this invention.
Figure 27:
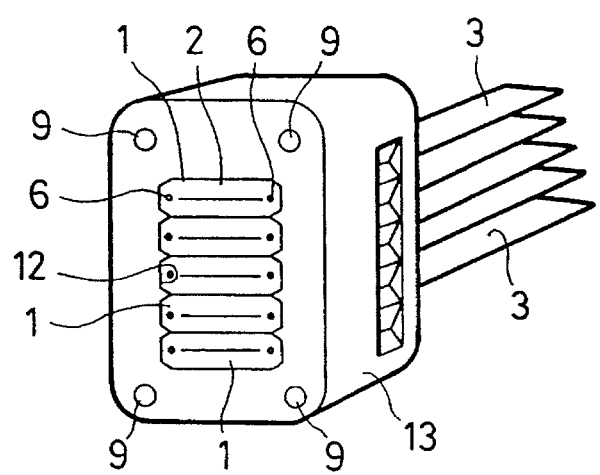
FIG. 27 is a perspective view showing related art for a method of collectively connecting multiple optical connectors.

The present invention is not limited to the above-described embodiments, but may be embodied in various other forms. For example, the link member 33 to which a plurality of clamp springs 32 are coupled is designed to be attachable and detachable by the screws 35 in the first embodiment. As shown in FIG. 26, however, the distal end of a straight plate 61 may be folded to be freely openable and closable with a fulcrum portion 62 as the point of support. An engage hole 63 is formed on the proximal side of the plate 61 and an engaging pawl 65 is formed at the distal end of a folded plate 64 so that the engaging pawl 65 is engageable with and disengageable from the engage hole 63. Further, recesses 66 where the clamp springs 32 are to be fitted are formed in the inner wall of the plate 61, so that the multiple clamp springs 32 attached to the individual connected optical connector pairs are placed in the recesses 66 of the plate 61. When the engaging pawl 65 is engaged with the engage hole 63 in this state to press the clamp springs 32 toward the plate 61 by the folded plate 64, the multiple clamp springs 32 are integrally coupled and held using the link member in FIG. 26.

In the above-described embodiments, the clamp springs 32 are provided for the respective optical connector pairs as shown in FIG. 4. Those clamp springs 32 may be formed as an integrated unit which is to be attached to both sides of the lamination of multiple connected optical connector pairs to keep the whole optical connector pairs connected.

Further, the projections 80 for positioning the optical connectors 1 into the retainers 24 are hemispherical in the fifteenth to seventeen and nineteenth embodiments. The shape of the projections is not limited to this particular shape, but may take other proper shapes, like polygonal cones such as a triangular pyramid, a cylindrical shape or a tapered cylindrical shape, as long as the distal ends of the projections are insertable in the pin holes 6. It is however preferable that the projections have a spherical shape, a conical shape or the like. Although only the pin holes are illustrated as the fitting holes, separate fitting holes for the projections 80 may be formed in the rear faces of the optical connectors 1.

Although the rear plate 67 of the engage portion 70 is an elastic plate in the eighteenth and nineteenth embodiments, the top plate 22 may be designed as an elastic plate instead or the top plate 22 and rear plate 67 may both be elastic plates.

In the eighteenth and nineteenth embodiments, the opening width E of the engage portion 70 is set smaller than the width C of the flange 14 of the optical connector 1 and the retaining width D of the engage portion 70 is set equal to the width C of the flange 14. However, the opening width E may be formed equal to the width C of the flange 14 of the optical connector 1 or the retaining width D may be set greater than the width C.

Although the altered-shape portion of an optical connector 1 is designed as the projecting flange 14 in the above-described embodiments, a recess may be formed in the outer surface of an optical connector as the altered-shape portion, so that multiple optical connectors are positioned and aligned and collectively connected using the recessed altered-shape portions.

What is claimed is:

1. A method of collectively connecting multiple optical connectors each having an altered-shape portion which is at least one of a recessed shape and a projecting shape on an outer surface, said method comprising the steps of:
   preparing an aligning and positioning jig for engaging said altered-shape portions of said multiple optical connectors to one another to position said multiple optical connectors;
   aligning and positioning first multiple optical connectors using said aligning and positioning jig so as to restrict movement of the first multiple optical connectors in said jig, at least in a forward direction toward faces of the first multiple optical connectors which are to be butted against second multiple optical connectors;
   then collectively connecting the first multiple optical connectors which are aligned and positioned on one side to the second multiple optical connectors which are aligned and positioned on another side; and
   then removing said aligning and positioning jig from multiple pairs of the connected first and second optical connectors.

2. The method according to claim 1, wherein after removing said aligning and positioning jig, a connection holding member for individually or collectively keeping connecting states of said pairs of connected optical connectors is detachably attached to said pairs of connected optical connectors.

3. The method according to claim 1, wherein after collectively connecting said multiple optical connectors aligned and positioned on one side to said multiple optical connectors aligned and positioned on the other side, a connection holding member for individually or collectively keeping connecting states of said pairs of connected optical connectors is detachably attached to said pairs of connected optical connectors before completely removing said aligning and positioning jig, and said aligning and positioning jig is completely removed after attachment of said connection holding member.

4. The method according to claim 2, wherein said connection holding member is provided for each pair of optical connectors and said connection holding members are coupled by a link member, thereby keeping aligned connection states of individual pairs of optical connectors.

5. The method according to claim 3, wherein said connection holding member is provided for each pair of optical connectors and said connection holding members are coupled by a link member, thereby keeping aligned connection states of individual pairs of optical connectors.

6. The method according to claim 4, wherein said link member is detachable so as to permit each pair of optical connectors to be detached from another pair of optical connectors while keeping each pair of optical connectors connected to each other, when said link member is detached.

7. The method according to claim 5, wherein said link member is detachable so as to permit each pair of optical connectors to be detached from another pair of optical connectors while keeping each pair of optical connectors connected to each other, when said link member is detached.

8. An aligning and positioning jig for use in collective connection of multiple optical connectors, each having an altered-shape portion which is at least one of a recessed shape and a projecting shape on an outer surface, said jig comprising:
   a jig body;
   retainers formed in said jig body for retaining first multiple optical connectors at predetermined aligned positions;
   engage portions for positioning the first optical connectors so as to restrict movement of the first optical connectors at least in a forward direction toward faces of the first multiple optical connectors which are to be butted against second multiple optical connectors, in cooperation with altered-shape portions of the retained optical connectors; and
   a detaching opening formed in said jig body for allowing said jig body to be detached from said first optical connectors while keeping said first optical connector in each retainer connected to a mating second optical connector.

9. The aligning and positioning jig according to claim 8, wherein each of optical connectors to be collectively connected has at least a pair of fitting holes formed in a rear end side, each of said retainers formed in said jig body has projections formed at positions corresponding to said fitting holes in such a way as to position each optical connector in the associated retainer when at least distal ends of said projections are inserted into said fitting holes.

10. The aligning and positioning jig according to claim 8, wherein each of said engage portions formed in said retainers of said jig body is made of an elastic material, and each of said engage portions has a retaining opening so as to be able to hold said altered-shape portion formed in a rear portion of each optical connector, an opening width of said retaining opening is set equal to or less than a width of said altered-shape portion.

* * * * *